United States Patent
Inukai

(10) Patent No.: US 7,362,591 B2
(45) Date of Patent: Apr. 22, 2008

(54) POWER SUPPLY DEVICE AND IMAGE FORMING APPARATUS

(75) Inventor: Katsumi Inukai, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 85 days.

(21) Appl. No.: 11/482,695

(22) Filed: Jul. 10, 2006

(65) Prior Publication Data

US 2007/0014129 A1  Jan. 18, 2007

(30) Foreign Application Priority Data

Jul. 12, 2005  (JP) ............................. 2005-203060
May 15, 2006  (JP) ............................. 2006-135621

(51) Int. Cl.
  *H02M 3/335* (2006.01)
  *B41L 39/00* (2006.01)
(52) U.S. Cl. .................... 363/21.01; 363/21.1; 399/37; 399/88
(58) Field of Classification Search ............... 363/16, 363/20, 21.01, 21.09, 21.1, 21.11, 21.17, 363/21.18, 95, 97, 131; 399/37, 88, 90
See application file for complete search history.

(56) References Cited

U.S. PATENT DOCUMENTS 5,414,862 A  5/1995  Suzuki et al.
5,612,857 A * 3/1997 Ishikawa ................. 363/21.02
6,408,148 B1 * 6/2002 Yamamoto ................... 399/88
6,806,445 B2 * 10/2004 Satoh ......................... 219/482
6,900,994 B2  5/2005  Asayama
7,289,745 B2 * 10/2007 Nara et al. .................... 399/88
2006/0222398 A1 * 10/2006 Nagasaki et al. ............. 399/88
2007/0025753 A1 * 2/2007 Saito et al. ................... 399/88

FOREIGN PATENT DOCUMENTS

JP  H1321722  12/1989
JP  2002165450  6/2002
JP  200437635  2/2004

* cited by examiner

Primary Examiner—Matthew V. Nguyen
(74) Attorney, Agent, or Firm—Baker Botts, L.L.P.

(57) ABSTRACT

When a detected current value deviates from a range between an upper limit value and a lower limit value, a pulse width adjustment operation for increasing or decreasing a currently set counter value is repeatedly performed at every operation time interval such that the detected current value is brought to be close to the range between the upper limit value and the lower limit value under a forward control. When the detected current value falls in the range between the upper and the lower limit values after execution of the forward control, a reverse control is executed such that a pulse width of a PWM signal is changed in an adjustment direction opposite to that under the forward control.

32 Claims, 21 Drawing Sheets

POWER SUPPLY DEVICE AND IMAGE FORMING APPARATUS

CROSS REFERENCE TO RELATED APPLICATION

This application claims priority from Japanese Patent Application No. 2005-2030600 filed Jul. 12, 2005 and Japanese Patent Application No. 2006-135621 filed May 15, 2006. The entire content of these priority applications are incorporated herein by reference.

TECHNICAL FIELD

The present invention relates to a power supply device that controls power supply to an electric load and an image-forming apparatus provided with the power supply device.

BACKGROUND

Prior image-forming apparatus have included a PWM circuit that outputs a pulse width modulation (PWM) signal, and a high voltage generation unit that applies electricity corresponding to the pulse width of the PWM signal to the electric load. The power supply device compares the current value of electric power supplied to the electric load with a target power value. If the current power value does not accord with the target power value, the pulse width of the PWM signal is increased or decreased by a predetermined amount stepwise by changing the counter value of the up-down counter until both values accord with each other, thus bringing the current power value to the target power value.

Under the above-described pulse width control for increasing or decreasing the pulse width of the PWM signal upon detection of the difference between the actual power value and the target power value, the follow-up delay inevitably occurs in the entire control system. The change in the power output from the high-voltage generation circuit may occur behind the pulse width control operation. Under the generally employed power control mode, the pulse width of the PWM signal is fixed to a constant value when the power value at the electric load reaches the target power value at the pulse width adjustment. Then the power value further changes owing to the follow-up delay, that is, overshoots, thus failing to execute a stable power supply control. The overshoot is a temporal phenomenon caused by the follow-up delay, and the power value will be brought into the steady state as passage of time. Therefore, the power control system may be structured to be held stand-by state until the power value is brought into the steady state after changing the pulse. In the aforementioned structure, however, as the time period for stand-by is required, quick power supply control cannot be executed. This may deteriorate quality of the image on the image-forming apparatus.

Thus, there is a need in the art for a power supply device that allows quick and stable power supply control to an electric load, and an image-forming apparatus provided with the power supply device.

SUMMARY

In a structure according to the present invention, if a detection value (value of voltage or current supplied to an electric load) deviates from a target value, forward control is executed to increase or decrease a pulse width of a PWM signal so as to correct the deviation. When the detection value reaches the target value (there is no deviation, or the magnitude relationship between the detection value and the target value is inverted), reverse control is executed for changing the pulse width of the PWM signal in the reverse direction of that of the forward control. Accordingly, the pulse width under the forward control is maintained when the detection value has reached the target value so as to prevent the deviation of the detection value from the target value. This makes it possible to realize quick and stable power supply control.

BRIEF DESCRIPTION OF THE DRAWINGS

Illustrative aspects in accordance with the present invention will be described in detail with reference to the following figures wherein:

FIG. 8 is a graph showing a relationship between an impedance of an electric load and set values of the control time interval and the like;

DETAILED DESCRIPTION

An example structure of the present invention will be described referring to FIGS. 1 to 7.

1. Outline Structure of Laser Printer

Figure 1:
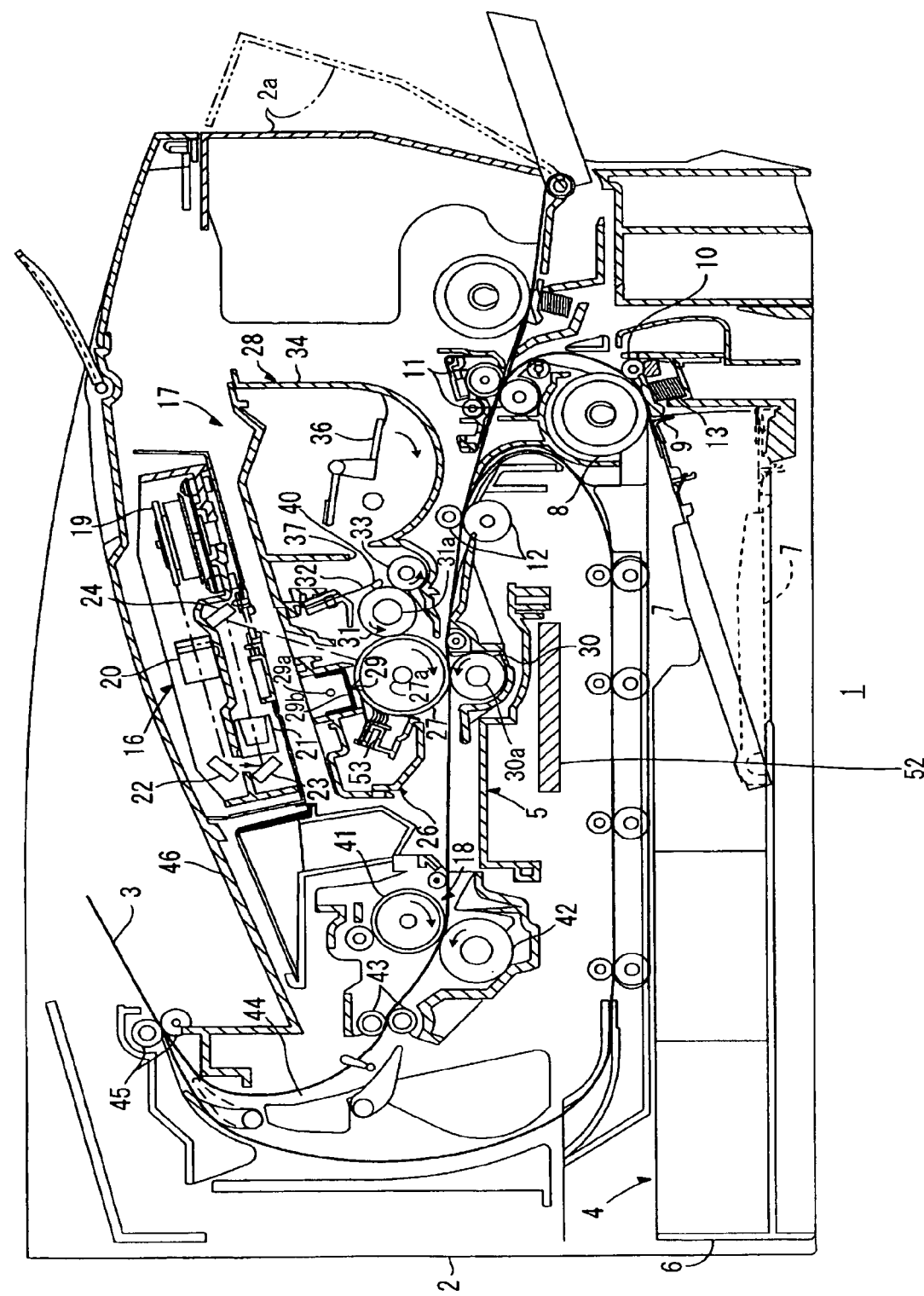
FIG. 1 is a sectional side elevation of a portion of a laser printer according to one aspect of the present invention.

FIG. 1 is a sectional side elevation of a portion of a laser printer as an exemplary image-forming apparatus according to one aspect of the present invention. Referring to FIG. 1, a laser printer 1 is structured to include a feeder portion 4 that feeds a sheet of paper 3, and an image forming portion 5 that forms an image on the sheet of paper 3 that has been fed in a body frame 2 as a main body of the image-forming apparatus.

(1) Feeder Portion

The feeder portion 4 includes a paper feed tray 6 that is detachably installed on the bottom of the inner surface of the body frame 2, a platen 7 provided within the paper feed tray 6, a paper feed roller 8 and a separation pad 9 both provided upward of the end at one side (right side in FIG. 1) of the paper feed tray 6 (hereinafter, the one side will be referred to as the front side, and the other side (left side in FIG. 1) will be referred to as a rear side.), paper dust cleaning rollers 10 and 11 provided downstream of the direction for feeding the paper 3 with respect to the paper feed roller 8, and resist rollers 12 provided downstream of the direction in which the paper 3 is fed with respect to the paper dust cleaning rollers 10 and 11, respectively.

The platen 7 which allows the sheets of paper 3 to be stacked is swingably supported at an end (rear end) away from the paper feed roller 8 such that the other end (front end) close to the paper feed roller 8 is moveable up and down. The platen 7 is biased by a spring (not shown) from the backside thereof in the upward direction. As the stack amount of the paper 3 increases, the platen 7 is swung downward with respect to the paper feed roller 8 against the bias force of the spring around the rear end as the supporting point. The paper feed roller 8 and the separation pad 9 are provided to face with each other. The separation pad 9 is pressed by a spring 13 provided on the backside thereof against the paper feed roller 8.

The paper 3 at the top-most position on the platen 7 is pressed against the paper feed roller 8 by the spring (not shown) from the backside of the platen 7. As the paper feed roller 8 rotates such that the paper 3 is interposed between the paper feed roller 8 and the separation pad 9 by the spring (not shown) from the backside of the platen 7. The paper 3, then, is fed sheet by sheet.

The paper dust on the paper 3 that has been fed is removed by the paperdust cleaning rollers 10 and 11, and the paper 3 is further fed to the resist rollers 12. The resist rollers 12 are formed of a pair of rollers so as to feed the paper 3 to the image forming position after the resist process. The image forming position corresponds with a position at which a toner image on a photosensitive drum 27 is transferred onto the paper 3. In the example structure, it corresponds with the position at which the photosensitive drum 27 contacts with a transfer roller 30 (corresponding to the "electric load" in the present invention).

(2) Image Forming Portion

The image forming portion 5 includes a scanner portion 16, a process cartridge 17, and a fixation portion 18.

(a) Scanner Portion

The scanner portion 16 is provided at the upper portion within the body frame 2, and includes a laser light emitting portion (not shown), a polygon mirror 19 that is rotated, lenses 20 and 21, and reflecting mirrors 22, 23 and 24. The laser beam emitted from the laser light emitting portion based on the image data passes or reflects such elements as the polygon mirror 19, the lens 20, the reflecting mirrors 22 and 23, lens 21, and the reflecting mirror 24 in the above order so as to be irradiated on the surface of the photosensitive drum 27 of the process cartridge 17 through rapid scanning.

(b) Process Cartridge

The process cartridge 17 provided below the scanner portion 16 includes a drum cartridge 26 as a photosensitive cartridge detachably attached to the body frame 2, and a development cartridge 28 housed in the drum cartridge 26. A front cover 2a is attached to the front surface of the body frame 2 such that the front cover 2a is opened and closed having its lower end portion functioning as a center axis. The process cartridge 17 is inserted so as to be detachably housed in the body frame 2 in the state where the front cover 2a is opened.

The development cartridge 28 housed detachable to the drum cartridge 26 includes a development roller 31 serving as a developer carrier (corresponding to the electric load in the present invention), a layer thickness control blade 32, a supply roller 33, and a toner hopper 34.

The toner hopper 34 is filled with nonmagnetic single component toner with positive charging as the developer. The toner within the toner hopper 34 is stirred by an agitator 36 rotatably supported at the center of the toner hopper 34, and released through a toner supply hole 37 formed at the rear side of the toner hopper 34. The agitator 36 is driven by a motor (not shown) so as to be rotated clockwise, as shown in the drawing.

The supply roller 33 is provided at the position to the rear of the toner supply hole 37 in a rotatable manner. The development roller 31 is rotatably provided opposite to the supply roller 33. The supply roller 33 and the development roller 31 abut to apply the pressing force with each other.

The supply roller 33 is formed by coating a roller made of a conductive foaming material on a metallic roller shaft, and driven by a motor (not shown) so as to be rotated in the arrow direction (counterclockwise).

The development roller 31 is formed by coating a roller made of a conductive rubber material on a metallic roller shaft 31a. Specifically, the roller of the development roller 31 is formed by applying a coat layer made of the fluorine contained urethane rubber or silicon rubber on the surface of the roller body made of the conductive urethane rubber or silicon rubber which contains carbon particles. A charged bias application circuit 61 (corresponding to the "power supply device" in the present invention) mounted on a high-voltage power supply circuit substrate 52 applies the development bias voltage Vc to the development roller 31 as described later. The development roller 31 is driven by a motor (not shown) so as to be rotated in the arrow direction (counterclockwise).

The layer thickness control blade 32 provided in the vicinity of the development roller 31 is supported at the development cartridge 28 around the development roller 31 such that a press portion 40 is in press contact on the development roller 31 by the elastic force of the blade body.

The toner discharged from the toner supply hole 37 is supplied to the development roller 31 accompanied with the rotation of the supply roller 33. Then positive frictional charging occurs between the supply roller 33 and the development roller 31. The toner supplied on the development roller 31 is further applied between the press portion 40 of the layer thickness control blade 32 and the development roller 31 so as to be carried thereon as a thin layer with a constant thickness.

The drum cartridge 26 includes the photosensitive drum 27 as the image carrier, a scorotron type electrifier 29 as an electrifier, a transfer roller 30 as a transfer element, and a cleaning brush 53 as a cleaning element.

The photosensitive drum 27 is disposed opposite to the development roller 31 to the rear thereof, and is rotatably supported in the arrow direction (clockwise) in the drum cartridge 26. The photosensitive drum 27 includes a cylindrical drum body, and a metallic drum shaft 27a at the axial center of the drum body so as to be supported. The drum body is made from an aluminum pipe, and has a surface provided with a positive charging photosensitive layer formed of polycarbonate. The drum shaft 27a is grounded.

The scorotron type electrifier 29 is provided above the photosensitive drum 27 opposite thereto at a predetermined interval so as not to be in contact with each other, and supported at the drum cartridge 26. The scorotron type electrifier 29 is an electrifier of scorotron type for positive charging to allow a charging wire 29a, for example, tungsten to generate corona discharge. A grid 29b is provided between the charging wire 29a and the photosensitive drum 27 so as to have the surface of the photosensitive drum 27 to be positively charged entirely. The charging bias application circuit 61 applies the charging bias voltage Vb (bias voltage for charging) to the charging wire 29a (corresponding to the "electric load" in the present invention).

The surface of the photosensitive drum 27 is entirely positively charged by the scorotron type electrifier 29 as it rotates, and then is exposed by the high speed scanning of the laser beam from the scanner portion 16 so as to form the electrostatic latent image based on the image data.

As the development roller 31 rotates, the positively charged toner carried on the surface of the development roller 31 is supplied to the electrostatic latent image formed on the surface of the photosensitive drum 27 upon being oppositely in contact with the toner, and selectively carried to be visualized, thus establishing the development.

The transfer roller 30 is disposed opposite to the photosensitive drum 27 at the lower portion thereof, and rotatably supported at the drum cartridge 26 in the arrow direction (counterclockwise). The transfer roller 30 is formed by coating a roller made of a conductive rubber material onto a metallic roller shaft 30a.

The roller shaft 30a of the transfer roller 30 is connected to the transfer bias application circuit 60 (corresponding to the "power supply device" in the present invention). The transfer bias voltage Va (bias voltage for transfer) is applied from the transfer bias application circuit 60 upon the transfer operation.

The cleaning brush 53 is provided opposite to the drum body of the photosensitive drum 27 in contact therewith. The cleaning brush 53 is made from a conductive member, to which the cleaning bias voltage (for example, partial voltage of the charging bias voltage Vc) is applied such that the negatively charged paper dust adhered to the photosensitive drum 27 is electrically sucked to be removed. The positively charged toner is not collected by the cleaning brush 53, and the negatively charged paper dust is selectively collected. The toner itself is collected by the development roller 31.

(c) Fixation Portion

The fixation portion 18 positioned to the rear of the process cartridge 17 at downstream side as shown in FIG. 1 includes a heat roller 41, a press roller 42 that presses the heat roller 41, and a pair of carrier rollers 43 provided downstream of the heat roller 41 and the press roller 42. The heat roller 41 made of a metal is provided with a halogen lamp for heating, and driven by a motor (not shown) so as to be rotated in the arrow direction (counterclockwise). The press roller 42 is driven by the heat roller 41 under the pressure so as to be rotated in the arrow direction (counterclockwise). At the fixation portion 18, the toner transferred on the paper 3 by the process cartridge 17 is subjected to the thermal fixation for the period at which the paper 3 passes between the heat roller 41 and the press roller 42. Thereafter, the paper 3 is further carried to an ejection path 44 by the carrier roller 43. The paper 3 fed to the ejection path 44 is further supplied to the ejection roller 45 so as to be ejected on the ejected paper tray 46.

2. Bias Application Circuit (1) Transfer Bias Application Circuit

Figure 2:
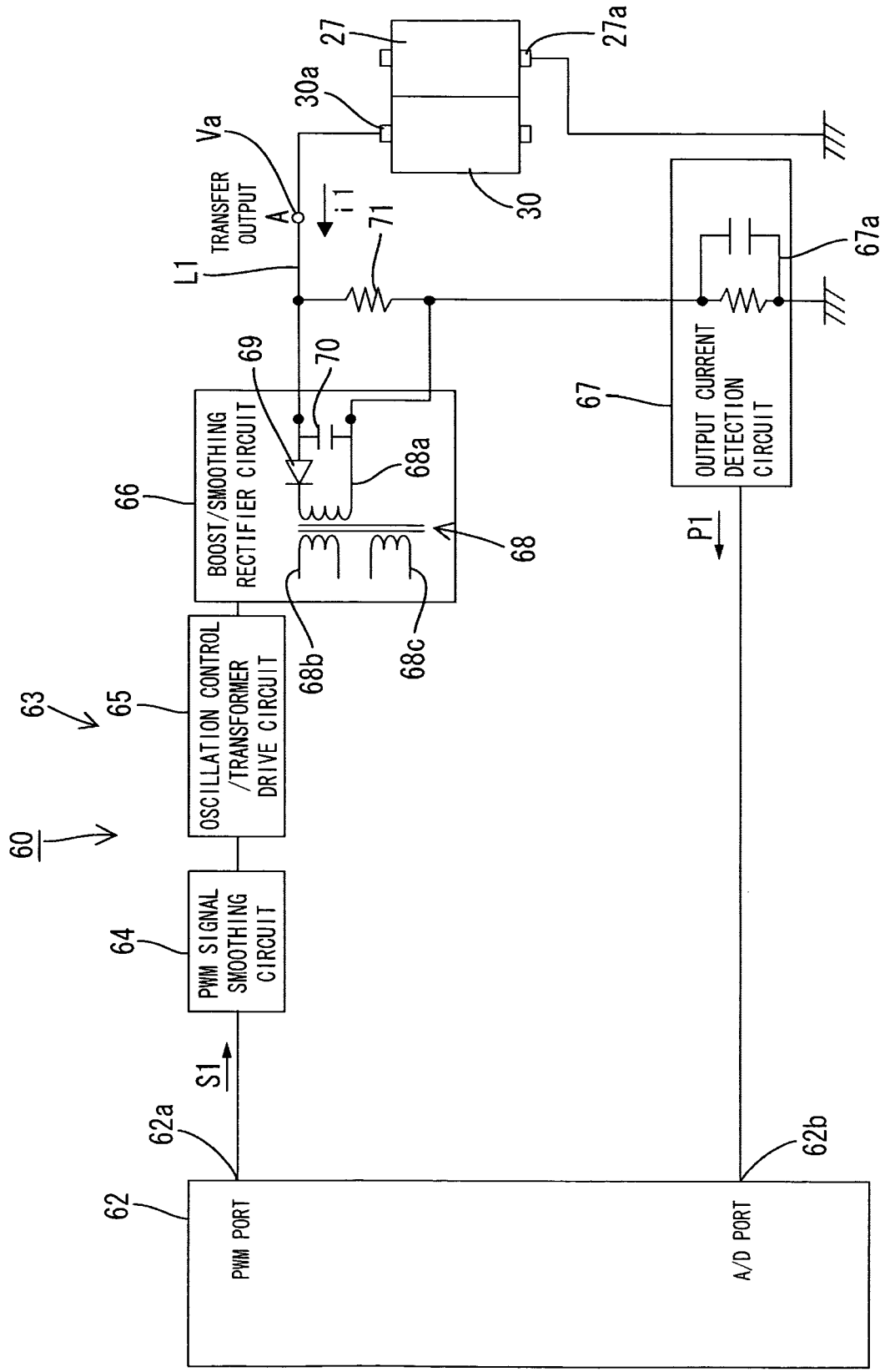
FIG. 2 is a block diagram of a structure of a portion of a transfer bias application circuit.

FIG. 2 is a block diagram of a portion of the transfer bias application circuit 60 that applies a sequential transfer bias voltage Va to the transfer roller 30. The transfer bias application circuit 60 includes a pulse width modulation (PWM) control circuit 62 and a high voltage output circuit 63.

The high voltage output circuit 63 includes a PWM signal smoothing circuit 64, an oscillation control/transformer drive circuit 65, a boost/smoothing rectifier circuit 66, and an output current detector circuit 67.

The PWM signal smoothing circuit 64 serves to smooth the PWM signal S1 from a PWM port 62a of the PWM control circuit 62 so as to be applied to the oscillation control/transformer drive circuit 65. The oscillation control/transformer drive circuit 65 is structured to apply the alternating current to a primary winding 68b of the boost/smoothing rectifier circuit 66 based on the received PWM signal S1.

The boost/smoothing rectifier circuit 66 includes a transformer 68, a diode 69, and a smoothing capacitor 70. The transformer 68 includes a secondary winding 68a, a primary winding 68b, and an auxiliary winding 68c. One end of the secondary winding 68a is connected to a connecting line L1 connected to the roller shaft 30a of the transfer roller 30 via the diode 69. The other end of the secondary winding 68a is grounded via the output current detector circuit 67. The smoothing capacitor 70 and the charge resistance 71 are connected to the secondary winding 68a in parallel with each other.

In the aforementioned structure, the alternating current is applied to the primary winding 68b such that the voltage applied to the primary winding 68b is boosted and rectified in the boost/smoothing rectifier circuit 66 such that the sequential transfer bias voltage Va is applied to the roller shaft 30a of the transfer roller 30. The current i1 applied to the transfer roller 30 is fed into an RC parallel circuit 67a of the output current detector circuit 67 such that the detection signal P1 in accordance with the current i1 is directed back to the A/D port of the PWM control circuit 62.

When the paper 3 reaches the image forming position, and the toner image on the photosensitive drum 27 is transferred on the paper 3, the transfer bias application circuit 60 is driven by a CPU (not shown) to apply the sequential transfer bias voltage Va to the roller shaft 30a of the transfer roller 30 to which an output terminal A of the high voltage output circuit 63 is connected.

In the aforementioned case, the PWM control circuit 62 applies the PWM signal S1 to the high voltage output circuit 63 so as to be driven, and executes the constant current control to output the PWM signal S1 to the PWM signal smoothing circuit 64 having its duty ratio (pulse width) changed such that the detected current value is in the target current range (from upper limit value th1 to a lower limit value th2) based on the detection signal P1 in accordance with the current value applied on the connecting line L1. The specific control process will be described later.

(2) Charged Bias Application Circuit

Figure 3:
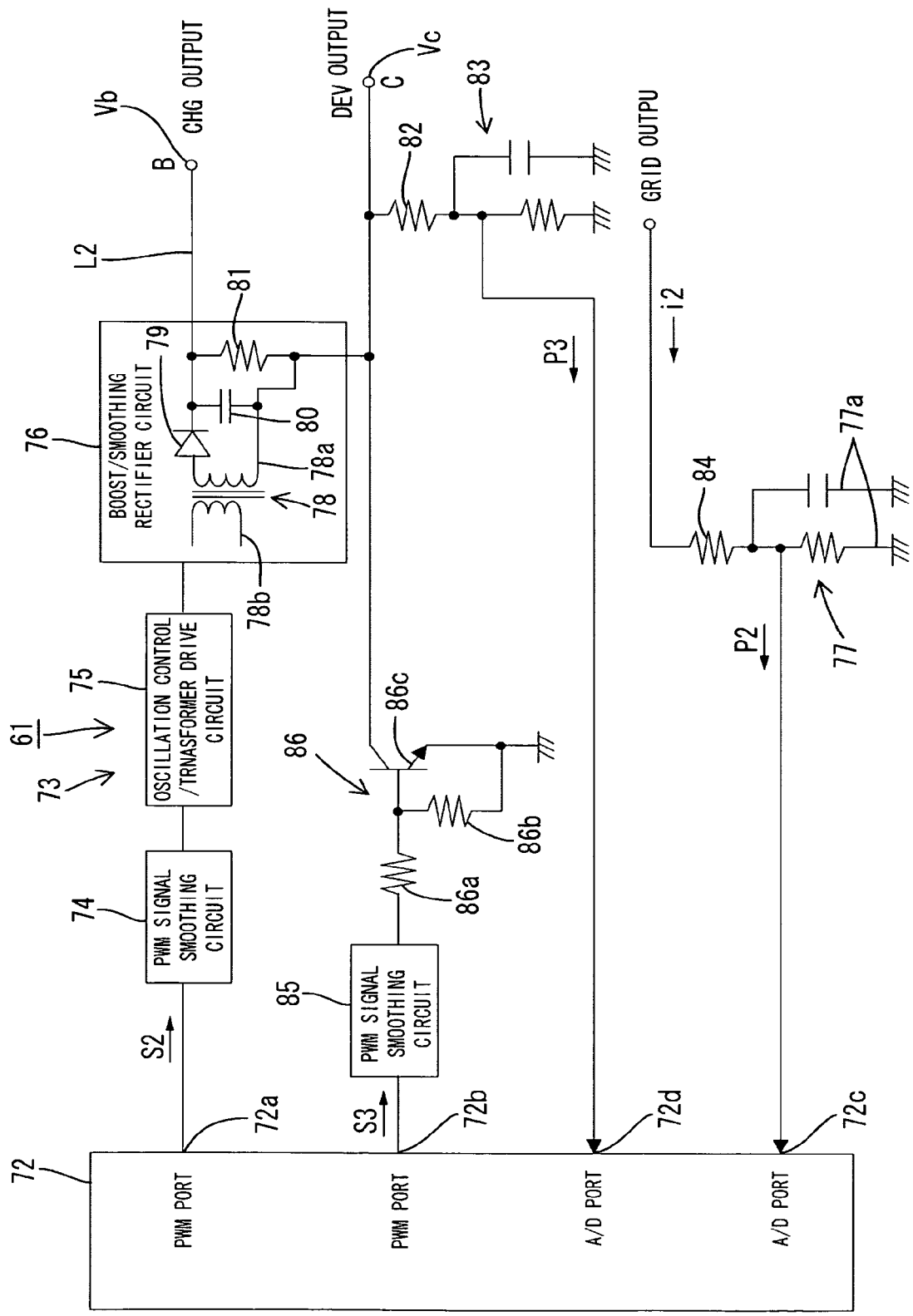
FIG. 3 is a block diagram of a structure of a portion of a charged bias application circuit.

FIG. 3 is a block diagram of a portion of the charged bias application circuit 61 that applies a charged bias voltage Vb to the charged wire 29a and a development bias voltage Vc to the development roller 31, respectively. The charged bias application circuit 61 includes a PWM control circuit 72 and a high voltage output circuit 73.

The high voltage output circuit 73 includes a PWM signal smoothing circuit 74 for charging, an oscillation control/transformer drive circuit 75, a boost/smoothing rectifier circuit 76, and an output current detector circuit 77 for charging.

The PWM signal smoothing circuit 74 for charging serves to smooth the PWM signal S2 from a PWM port 72a of the PWM control circuit 72 so as to be applied to the oscillation control/transformer drive circuit 75. The oscillation control/transformer drive circuit 75 is structured to apply the alternating current to the primary winding 78b of the boost/smoothing rectifier circuit 76 based on the received PWM signal S2.

The boost/smoothing rectifier circuit 76 includes a transformer 78, a diode 79, and a smoothing capacitor 80. The transformer 78 includes a secondary winding 78a and a primary winding 78b. One end of the secondary winding 78a is connected to a connecting line L2 connected to the charged wire 29a via the diode 79. Meanwhile, the other end of the secondary winding 78a is grounded via a voltage dividing resistor 82 and an RC parallel circuit 83. The grid 29b is grounded via a voltage dividing resistor 84 and the RC parallel circuit 77a.

The high voltage output circuit 73 includes a PWM signal smoothing circuit 85 for development of an image, and a shunt circuit 86. The PWM signal smoothing circuit 85 smoothes a PWM signal S3 from the PWM port 72b of the PWM control circuit 72 so as to be applied to the shunt circuit 86. The shunt circuit 86 includes an input resistor 86a, and a transistor 86c having its base and emitter connected via a resistance 86b such that the voltage in accordance with the PWM signal S3 from the PWM signal smoothing circuit 85 is generated. The collector of the transistor 86c is connected to a point at which a discharge resistor 81 is connected to the voltage dividing resistor 82.

In the aforementioned structure, when the alternating current is applied to the primary winding 78b, the voltage of the primary winding 78b is boosted and rectified in the boost/smoothing rectifier circuit 76 so as to be applied to the charged wire 29a as the charged bias voltage Vb. The voltage at a point where the discharge resistor 81 is connected to the voltage dividing resistor 82 is applied to the roller shaft 31a of the development roller 31 as the development bias voltage Vc. The current i2 applied through the grid 29b flows to the RC parallel circuit 77a of the output current detector circuit 77. Then the detection signal P2 in accordance with the current i2 is directed back to the A/D port 72c of the PWM control circuit 72. Also, the detection signal P3 in accordance with the load voltage (development bias voltage Vc) of the RC parallel circuit 83 is directed back to the A/D port 72d of the PWM control circuit 72.

When the laser printer 1 is activated, the CPU (not shown) activates the charged bias application circuit 61 to apply the charged bias voltage Vb to the charged wire 29a connected to an output terminal B of the high voltage output circuit 73.

The PWM control circuit 72 executes a constant current control to output the PWM signal S2 having the duty ratio (pulse width) appropriately changed to the PWM signal smoothing circuit 74 such that the detected current value is in the target current range described later, based on the detection signal P2 in accordance with the current value flowing through the connecting line L2 (grid 29b) while applying the PWM signal S2 to the high voltage output circuit 73 so as to be driven. The specific control operation will be described later.

The PWM control circuit 72 applies the PWM signal S3 to the PWM signal smoothing circuit 85 so as to be driven, and applies the development bias voltage Vc to the roller shaft 31a of the development roller 31 connected to an output terminal C of the high voltage output circuit 73. Then, the PWM control circuit 72 executes a constant voltage control to output the PWM signal to the PWM signal smoothing circuit 85 having the duty ratio (pulse width) appropriately changed to the PWM signal smoothing circuit 85 such that the detected voltage value is within the target voltage range based on the detection signal P3 in accordance with the load voltage (development bias voltage Vc) of the RC parallel circuit 83 while applying the PWM signal S3 to the high voltage output circuit 73 so as to be driven.

3. Structure of PWM Control Circuit

Figure 4:
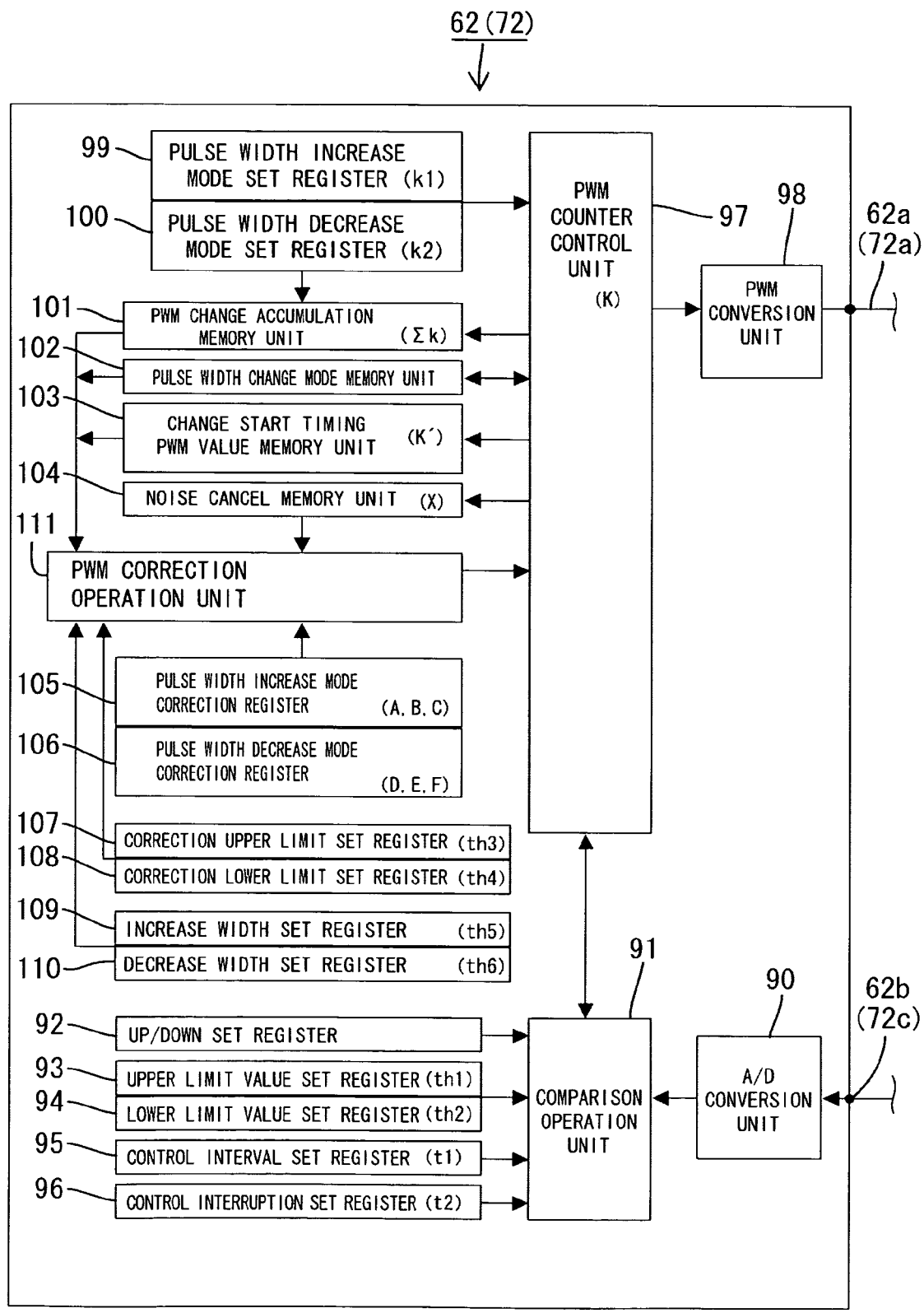
FIG. 4 is a block diagram of a structure of a portion of a PWM control circuit.

FIG. 4 is a block diagram of a portion of PWM control circuits 62 and 72. Each of these PWM control circuits 62 and 72 is formed of an ASIC (Application Specific Integrated Circuit).

Referring to FIG. 4, the PWM control circuit 62 (72) subjects the detection signal P1 (P2) from the A/D port 62b (72c) to A/D conversion by the A/D conversion unit 90 so as to be sent to a comparison operation unit 91. The comparison operation unit 91 is connected to an UP/DOWN set register 92, an upper limit value set register 93, a lower limit value set register 94, a control interval set register 95, and a control interruption set register 96.

The UP/DOWN set register 92 sets the value in accordance with the characteristic (based on which the output value is increased or decreased as the increase in the duty ratio of the PWM signal) of the high voltage output circuit 63 (73) connected to the PWM control circuit 62 (72). In the example structure, since the high voltage output circuit 63 (73) operates to increase the output value as the duty ratio of the PWM signal S1 (S2, S3) increases, the output value is set to the UP side.

The upper limit value set register 93 and the lower limit value set register 94 set the upper limit value th1 and the lower limit value th2 of the target current value to be applied to the transfer roller 30 (charged wire 29a), respectively. The control interval set register 95 sets the control time interval t1 with respect to the comparison operation executed in the comparison operation unit 91. The control interruption set register 96 sets the control interruption time t2 taken after execution of the reverse control until the resumption of the forward control to be described later (corresponding to the "stand-by period"). Each set value and set content of the respective registers 92 to 96 may be changed by the CPU through a predetermined operation of the operator in response to the characteristics of the high voltage output circuit 63 (73), electric load (transfer roller 30 and charged wire 29a), or the like.

The comparison operation unit 91 determines whether the detected current value i (i1, i2 corresponding to the output detection value) is within a range from the upper limit value th1 to the lower limit value th2 sequentially based on the detection signal P1 (P2) that has been A/D converted at the control interval of t1. The comparison operation unit 91 compares the detected current value i with the upper limit value th1 and the lower limit value th2 so as to determine whether the detected current value i deviates from the allowable range between the upper limit value th1 and the lower limit value th2 (target value).

The PWM control circuit 62 (72) includes a PWM counter control unit 97 (corresponding to the "pulse width control unit" in the present invention), a PWM conversion unit 98, and a PWM correction operation unit 111. The PWM counter control unit 97 includes an up-down counter that increases and decreases the counter value K based on the forward control and the reverse control to be described later. The PWM conversion portion 98 outputs the PWM signal S1 (S2) having the pulse width changed in accordance with the increase or decrease in the counter value K by the PWM counter control portion 97 to the PWM port 62a (72a, 72b). The counter value K is an arbitrary value in the range from 0 to 100, for example. The duty ratio of the PWM signal S1 is determined corresponding to the value. For example, if the counter value K is equal to zero, the duty ratio becomes 0%. Meanwhile, if the counter value K is equal to 100, the duty ratio becomes 100%.

The PWM counter control unit 97 is connected to the comparative arithmetic unit 91 so as to receive the determination results. The PWM counter control unit 97 is connected to a pulse width increase mode set register 99, and a pulse width decrease mode set register 100. The pulse width increase mode set register 99 and the pulse width decrease mode set register 100 set the pulse width increase value k1 and the pulse width decrease value k2 at the respective pulse width adjustment operations under the forward control executed in response to the determination in the comparison operation unit 91 at every control time interval t1.

The PWM counter control portion 97 adds the pulse width increase value k1 set by the pulse width increase mode set register 99 such that the PWM signal S1 (S2) with its width increased by the amount corresponding to the pulse width increase value k1 (corresponding to the "unit adjustment amount") is output from the PWM conversion unit 98 in response to reception of the determination that the detected current value i is below the lower limit value th2 from the comparison operation unit 91 (the operation will be referred to as the "pulse width increase mode"). Meanwhile, in response to reception of the determination that the detected current value i exceeds the upper limit value th1 from the comparison operation unit 91, the pulse width decrease value k2 set by the PWM pulse width decrease mode set register 100 is subtracted from the present counter value K to decrease the pulse width by the amount corresponding to the pulse width decrease value k2 (corresponding to the "unit adjustment amount" in the present invention) and to output the resultant PWM signal S1 (S2) from the PWM conversion unit 98 (the operation will be referred to as the "pulse width decrease mode")

The pulse width increase value k1 and the pulse width decrease value k2 may have the same values. In the example structure, as the "pulse width increase mode" and the "pulse width decrease mode" are different in the characteristic of the change in the detected current value i in response to the change by the same pulse width, they are set to different values. The pulse width increase value k1 and the pulse width decrease value k2 are set such that the amount of change in the detected current value i in response to the change in the pulse width is set to the value smaller than the deviation of the upper limit value th1 and the lower limit value th2. This makes it possible to prevent the detected current value i from jumping over the range defined by the upper and the lower limit values th1 and th2 in the single pulse width adjustment. The pulse width increase value k1 and the pulse width decrease value k2 may be changed by the CPU through predetermined operations of an operator conforming to characteristics of the high voltage output circuit 63 (73), electric loads (transfer roller 30, charged wire 29a, and the like)

The PWM counter control unit 97 is connected to a PWM change accumulation memory unit 101, a pulse width change mode memory unit 102, a change start timing PWM value memory unit 103, and the noise cancel memory unit 104. In the PWM change accumulation memory unit 101 starts the forward control in response to the determination made by the comparison operation unit 91 that the detected current value i is not in the range between the upper limit value th1 and the lower limit value th2. Then the accumulation change value Σk (corresponding to the "total change amount" (accumulation change value)) obtained by accumulating the pulse width increase values k1 (pulse width decrease values k2) during the pulse width adjustment operations executed at the control time interval t1 is sequentially updated.

The pulse width change mode memory unit 102 stores the mode (STOP mode, pulse width increase mode, pulse width decrease mode) currently executed by the PWM counter control unit 97. The change start timing PWM value memory unit 103 stores the initial counter value K' (corresponding to the "starting pulse width of PWM signal" in the present invention). The noise cancel memory unit 104 stores the number X of determination results including such states after the forward control where the detected current value i is within the range between the upper lower limit th1 and the lower limit value th2, it exceeds the upper limit value th1 from the point equal to or smaller than the upper limit value th1, or it is below the lower limit value th2 from the point equal to or larger than the lower limit value th2.

The PWM correction operation unit 111 serves to calculate the correction value (in accordance with the amount required for correcting the PWM signal S1 (S2)) of the counter value K based on the expression upon execution of the reverse control to be described later. The PWM correction operation unit 111 is connected to a pulse width increase mode correction register 105 and a pulse width decrease mode correction register 106. The pulse width increase mode correction register 105 sets parameters A, B and C for the aforementioned expression upon execution of the pulse width increase mode. The pulse width decrease mode correction register 106 sets the parameters D, E, and F for the aforementioned expression upon execution of the pulse width decrease mode. In the example structures as described above, those values are set to different values in accordance with the characteristics of the pulse width increase and decrease modes, respectively.

The PWM correction operation unit 111 is connected to a correction upper limit set register 107 and a correction lower limit set register 108. The correction upper limit set register 107 sets the correction upper limit value th3 (corresponding to the "limit pulse width" in the present invention) of the counter value K (=K'+Σk1) during execution of the pulse width increase mode. The correction lower limit set register 108 sets the correction lower limit value th4 (corresponding to the "limit pulse width" in the present invention) of the counter value K ($=$K'$-\Sigma$k2) in the PWM counter control portion 97 during execution of the pulse width decrease mode. In this configuration, the correction upper limit value th3 is set as the counter value K such that the duty ratio of the PWM signal S1 (S2) becomes 85%, for example. The correction lower limit value th4 is set as the counter value K such that the duty ratio of the PWM signal S1 (S2) becomes 10%.

The PWM correction operation unit 111 is connected to an increase width set register 109 and a decrease width set register 110. The increase widthset register 109 sets an increase width limit value th5 (corresponding to the "limit change amount" in the present invention) of the accumulation change value $\Sigma$k1 of the pulse width increase value k1 under the pulse width increase mode. The decrease width set register 110 sets a decrease width limit value th6 (corresponding to the "limit change amount") of the accumulated change value $\Sigma$k2 of the pulse width decrease value k2 under the pulse width decrease mode.

4. Control Executed in PWM Control Circuit

Figure 5:
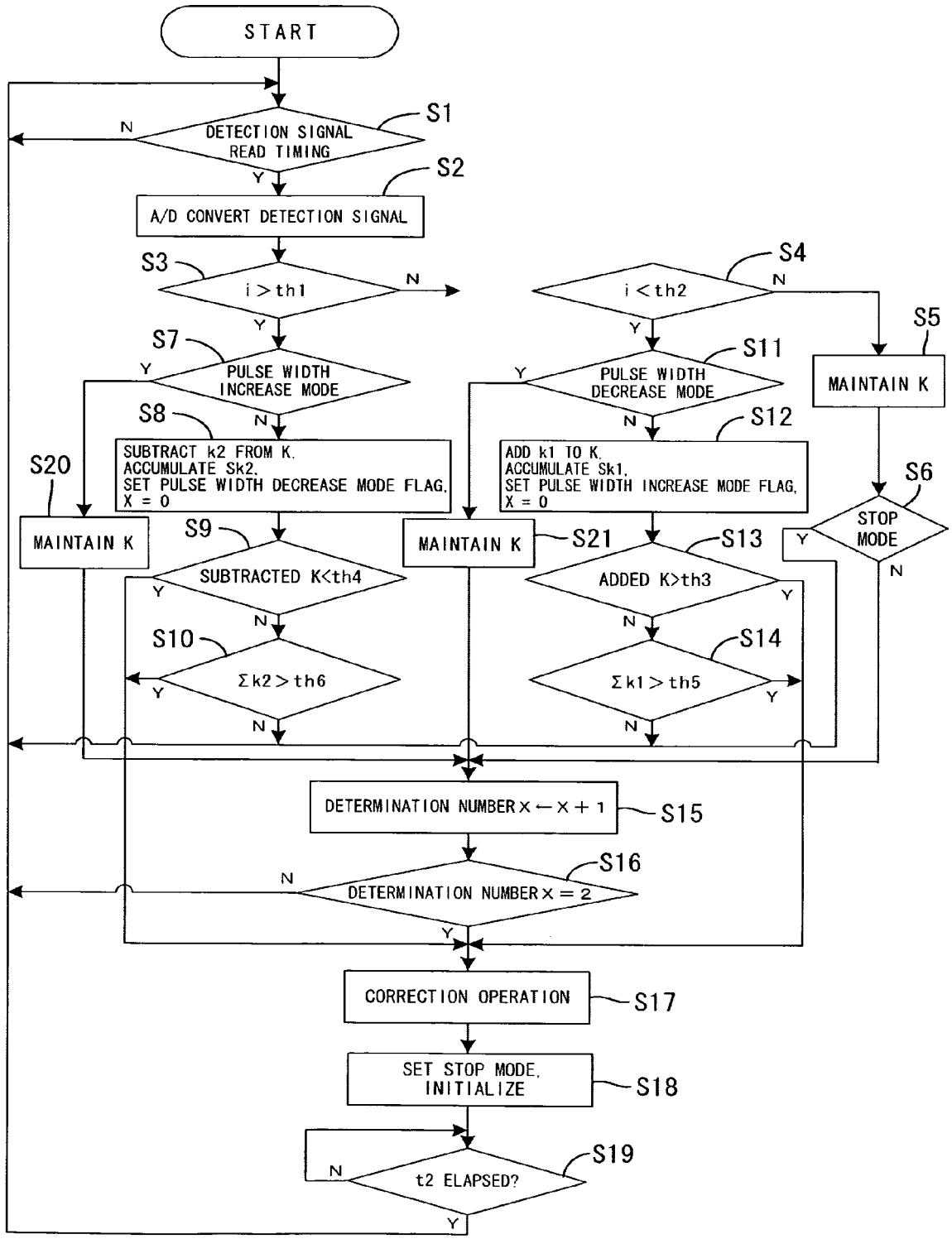
FIG. 5 is a flowchart of a control routine executed in the PWM control circuit.

FIG. 5 is a flowchart of a control routine executed in the PWM control circuit 62 (72). First in step S1, when the PWM control circuit 62 (72) is driven by the CPU, the comparison operation unit 91 determines whether it is the time to read the detection signal P1 (P2), that is, whether a predetermined control time interval t1 has passed. Then in step S2, the A/D conversion unit 90 reads the detection signal P1 (P2) that has been A/D converted at the control time interval t1.

The comparison operation unit 91 determines whether the detected current value i is in the range between the upper limit value th1 and the lower limit value th2 sequentially in steps S3 and S4. If the detected current value i is in the range between the upper limit value th1 and the lower limit value th2, that is, N is obtained in steps S3 and S4, the process proceeds to step S5 where the PWM counter control unit 97 maintains the currently set counter value K, that is, the pulse width adjustment of the PWM signal S1 (S2) is not performed. If the flag indicating STOP mode has been set initially in the pulse width change mode memory unit 102, Y is obtained in step S6. The process then returns to step S1.

(1) Forward Control

If the detected current value i deviates from the range between the upper limit value th1 and the lower limit value th2, the pulse width adjustment is performed to gradually increase or decrease the currently set counter value K by a predetermined amount at every control time interval t1 repeatedly such that the forward control is executed to bring the detected current value i to be close to the range between the upper limit value th1 and the lower limit value th2.

(a) Detected Current Value Exceeds the Upper Limit Value:

If the detected current value i exceeds the upper limit value th1, that is, Y is obtained in step S3, the process proceeds to step S7 where the PWM counter control unit 97 determines whether the currently set mode has been the pulse width increase mode based on the data stored in the pulse width change mode memory unit 102. If it is determined that the pulse width increase mode has not been set, that is, N is obtained in step S7, the process proceeds to step S8 where the PWM counter control unit 97 executes the subsequent process, that is, the pulse width adjustment for subtracting the pulse width decrease value k2 set in the pulse width decrease mode set register 100 from the current counter value K so as to bring the current detected value i close to the upper limit value th1. The accumulation change value $\Sigma$k2 is calculated to be written and updated in the PWM change accumulation memory unit 101. The flag indicating the pulse width decrease mode is set in the pulse width change mode memory unit 102 to initialize the number of determination X to zero. In the first pulse width adjustment operation under the forward control, the initial counter value K' before the pulse width adjustment is stored in the change start timing PWM value memory unit 103 before execution of the pulse width adjustment.

Then in step S9, the PWM correction operation unit 111 determines whether the counter value K after subtraction ($=$K'$-\Sigma$k2) is below the corrected lower limit value th4 set in the correction lower limit set register 108. If it is determined that the counter value K is not below the corrected lower limit value th4, that is, N is obtained in step S9, the process proceeds to step S10. In step S10, the PWM correction operation unit 111 determines whether the accumulated change value $\Sigma$k2 exceeds the decrease width limit value th6 set in the decrease width set register 110. If it is determined that the $\Sigma$k2 does not exceed the decrease width limit value th6, that is, N is obtained in step S10, the process returns to step S1.

The PWM control circuit 62 (72) subtracts the pulse width decrease value k2 from the counter value at the control time interval t1 such that the pulse width of the PWM signal S1 (S2) is decreased stepwise repeatedly to execute the forward control that allows the detected current value i to be close to the range between the upper limit value th1 and the lower limit value th2.

(b) Detected Current Value is Below the Lower Limit Value:

If it is determined that the detected current value i is below the lower limit value th2, that is, N is obtained in step S3 and Y is obtained in Y obtained in step S4, the process proceeds to step S11 where the PWM counter control unit 97 determines whether the currently set mode is in the pulse width decrease mode based on the content stored in the pulse width change mode memory unit 102. If it is determined that the pulse width decrease mode has not been set, that is, N is obtained in step S11, the process proceeds to step S12 where the subsequent process is executed by the PWM counter control unit 97. That is, the pulse width adjustment is executed by adding the pulse width increase value k1 set in the pulse width increase mode set register 99 to the current counter value K so as to bring the current detected value i to be close to the lower limit value th2. The accumulation change value $\Sigma$k1 is calculated to be stored and updated in the PWM change accumulation memory unit 101. In the pulse width change mode memory unit 102, the only the flag indicating the pulse width increase mode is set so as to initialize the determination number X to zero. In the first adjustment under the forward control, the initial counter value K' before adjustment of the pulse width is stored in the change start timing PWM value memory unit 103.

In step S13, it is determined whether the added counter value K ($=$K'$+\Sigma$k1) exceeds the corrected upper limit value th3 set in the correction upper limit set register 107. If it does not exceed the corrected upper limit value th3, that is, N is obtained in step S13, the process proceeds to step S14 where the PWM correction operation unit 111 determines whether the accumulation change value $\Sigma$k1 exceeds the increase width limit value th5 set in the increase width set register 109. If it does not exceed the increase width limit value th5, that is, N is obtained in step S14, the process returns to step S1.

The PWM control circuit 62 (72) adds the pulse width increase value k1 to the counter value at every control time interval t1 so as to repeatedly increase the pulse width (duty ratio) of the PWM signal S1 (S2) stepwise. The forward control that brings the detected current value i to be close to the range between the upper limit value th1 and the lower limit value th2 is executed.

(2) Reverse Control (a) Detected Current Value in the Range Between Upper and Lower Limit Values after Forward Control:

After execution of the forward control, when the detected current value i is brought into the range between the upper limit value th1 and the lower limit value th2, that is, N is obtained in both steps S3 and S4, the process proceeds to step S5 where the counter value K is maintained. As the flag indicating either the pulse width increase mode or the pulse width decrease mode has been set in the pulse width change mode memory unit 102, that is, N is obtained in step S6, the process proceeds to step S15 where the PWM correction operation unit 111 adds 1 to the determination number X. The process further proceeds to step S16 where it is determined that the determination number is 2.

If the determination number is 1, that is, N is obtained in step S16, the process returns to step S1. If the determination number is 2, that is, Y is obtained in step S16, the reverse control is executed based on the correction operation to be described later. When the determination is sequentially made twice with respect to the states that the detected current value i is in the range between the upper and the lower limit values th1 and th2, it exceeds the upper limit value th1 from the point equal to or smaller than the upper limit value th1, and it is below the lower limit value th2 from the point equal to or larger than the lower limit value th2, the reverse control is executed. The aforementioned structure is intended to eliminate the influence of noise, that is, to provide the noise cancel function as there may be the case where the temporary noise generated in the high voltage output circuit 63 (73) interferes with accurate detection of the detected current value i. If the detected current value i exceeds the upper limit value th1 in spite of the pulse width increase mode, that is, Y is obtained in both steps S3 and S7, it may be considered to have been caused by the noise. In this case, the present counter value K is maintained in step S20, and the process proceeds to step S15. If the detected current value i is below the lower limit value th2 in spite of the pulse width decrease mode, that is, Y is obtained both in steps S4 and S11, it may be considered to have been caused by the noise. In this case, the present counter value K is maintained in step S21, and the process proceeds to step S15.

Then in step S17, the PWM correction operation unit 111 obtains correction values h (h1, h2) with respect to the counter value K for the purpose of changing the pulse width of the PWM signal S1 (S2) in the direction opposite to the one under the forward control using the expression below.

Under the Pulse Width Increase Mode:

$$h1 = (\Sigma k1) \times [\{(\Sigma k1) - A\}/\{(\Sigma k1) + B\}] - C; \text{ and}$$

Corrected counter value K=initial counter value K'+correction value h1.

When the relationship of corrected counter value K>initial counter value K'−k1 is established, the relationship of corrected counter value K=initial counter value K'+k1 will be established.

Under the pulse width decrease mode:

$$h2 = (\Sigma k2) \times [\{(\Sigma k2) - D\}/\{(\Sigma k2) + E\}] - F; \text{ and}$$

Corrected counter value K=initial counter value K'−correction value h2.

When the relationship of corrected counter value K>initial counter value K'+k2 is established, the relationship of the corrected counter value K=initial counter value K'−k2 will be established.

Figure 6:
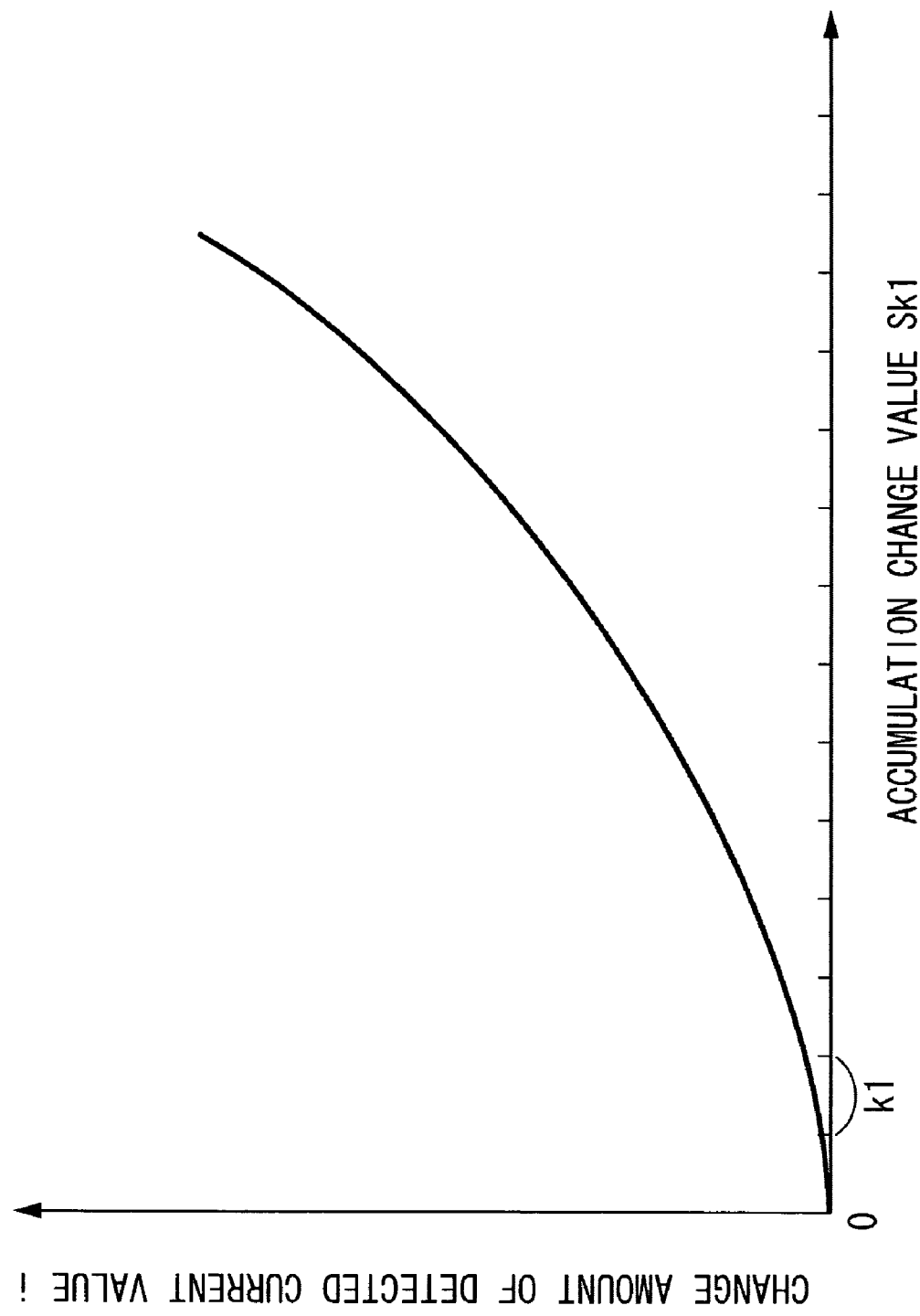
FIG. 6 is a characteristic graph representing a relationship between an accumulation change value and a change in the detected current value in the steady state.

The aforementioned parameters A to F are positive numbers set in the pulse width increase mode correction register 105 and the pulse width decrease mode correction register 106, respectively. FIG. 6 is a characteristic graph showing the relationship between the accumulation change value $\Sigma k1$ that has been increased by the PWM counter control unit 97 by every pulse width increase value k1, and the change amount of the detected current value i in the steady state resultant from pulse width adjustment with the counter value K changed by the respective accumulation change values $\Sigma k1$. The relationship varies depending on the individual high voltage output circuit 63 (73), which may be obtained experimentally.

In the example structure, the pulse width increase operation for adding the pulse width increase value k1 at every control time interval t1 is repeatedly performed after the start of the forward control. In the case where the detected current value i is in into the range between the upper limit value th1 and the lower limit value th2, when the counter value K (pulse width of the PWM signal S1 (S2)) at that time is maintained, the forward control for increasing detected current value i is further continued owing to the follow-up delay in the high voltage output circuit 63 (73). This may cause the detected current value i to deviate from the range between the upper limit value th1 and the lower limit value th2.

In the case where the detected current value i reaches the lower limit value th2 under the pulse width increase mode, the counter value K may be decreased ideally for reducing the pulse width of the PWM signal S1 (S2) to the degree that maintains the detected current value i. The relationship in the characteristic graph may be used to obtain the counter value K with which the detected current value i in the stationary state reaches the lower limit value th2.

In the example structure, the corrected counter value K is derived from the expression based on the initial counter value K' and the accumulation change value $\Sigma k1$. This may eliminate the need of providing the table with respect to the accumulation change values $\Sigma k1$ and the detected current values i based on the characteristic graph, thus suppressing the memory capacity. The parameters A, B and C in the expression under the pulse width increase mode are set to values conforming to the relationship shown in the graph of FIG. 6 as close as possible. Under the pulse width decrease mode, the characteristic graph like the one shown in FIG. 6 may be experimentally obtained, and the parameters D, E and F for the expression for the pulse width decrease mode are set to values conforming to the resultant relationship.

Figure 7:
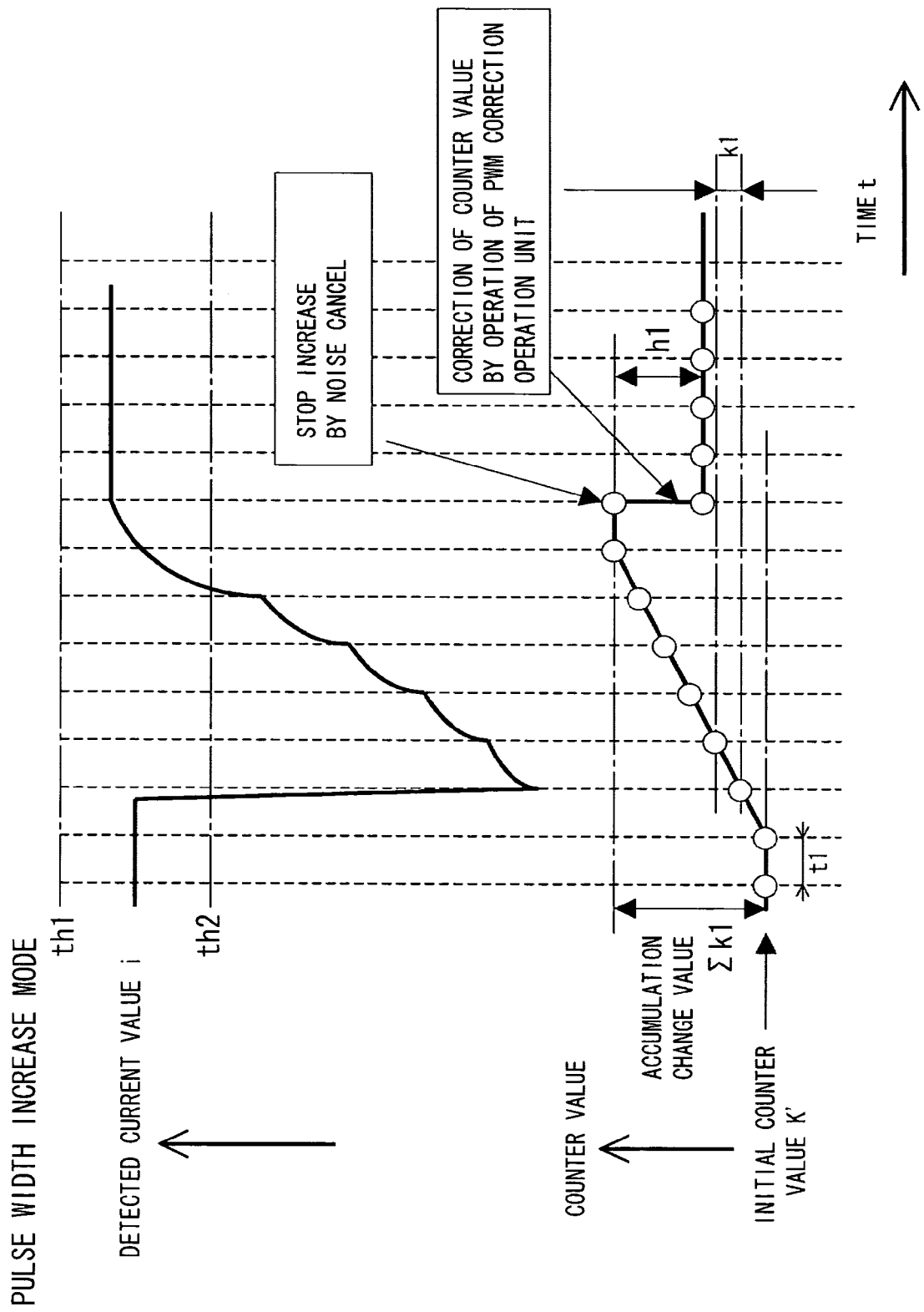
FIG. 7 is an explanatory view that represents each change in the counter value and the detected current value under the forward and reverse control modes.

Referring to FIG. 7, under the forward control, the pulse width increase value k1 is added to the counter value K, and the detected current value i increases with the follow-up delay. If it is determined that the detected current value i has reached the lower limit value th2, and the same determination is made after passage of the subsequent control time interval t1, the reverse control is executed. The PWM correction operation unit 111 obtains the corrected counter value K corresponding to the pulse width of the PWM signal S1 (S2) that causes the detected current value i in the stationary state to become substantially the lower limit value th2. The PWM counter control unit 97 decreases the present counter value to the corrected counter value K at a time or stepwise.

This makes it possible to maintain the detected current value i in the range between the upper limit value th1 and the lower limit value th2. The constant current control may be executed quickly and stably.

Referring back to FIG. 5, the determination number X and the accumulation change value Σk are initialized in step S18, and only the flag indicating STOP mode is set in the pulse width change mode memory unit 102. The process is kept in standby state until the elapse of the control interruption time t2, and it returns to step S1. When the correction is performed under the reverse control, a certain time period may be taken for the detected current value i to be brought into the stationary state. Meanwhile, the aforementioned structure allows the forward control to be resumed after the elapse of the control stop time t2 to bring the detected current value i into the stationary state. The constant current control may further be executed stably.

(b) Counter Value K with Pulse Width Changed has Reached the Upper or Lower Limit Correction Value after Execution of the Forward Control:

If the counter value K after subtraction (=K'−Σk2) is below the correction lower limit value th4 under the pulse width decrease mode, that is, Y is obtained in step S9, or the counter value K after addition (=K'+Σk1) exceeds the correction upper limit value th3 under the pulse width increase mode, that is, Y is obtained in step S13, the process proceeds to step S17 where the above-described reverse control is executed. In the example structure, if the pulse width of the adjusted PWM signal S1 (S2) is changed to exceed the value corresponding to the counter value in a predetermined range between the correction upper limit value th3 and the correction lower limit value th4, that is, in the range from 10% to 85%, the stable constant current control may not be executed. The reverse control is executed in the case where the increased or decreased counter value K deviates from the range between the correction upper limit value th3 and the correction lower limit value th4.

(c) Accumulation Change Value has Reached the Limit Value after Execution of the Forward Control:

If the accumulation change value Σk2 exceeds the pulse width decrease limit value th6 under the pulse width decrease mode, that is, Y is obtained in step S10, or the accumulated change value Σk1 exceeds the increase width limit value th5 under the pulse width increase mode, that is, Y is obtained in step S14, the process proceeds to step S17 where the above-described reverse control is executed.

Under the forward control, the pulse width adjustment with respect to the pulse width of the PWM signals repeatedly performed stepwise may cause the follow-up delay in the operation for outputting electric power in accordance with the PWM signal of the adjusted pulse width owing to the circuit elements that constitute the high voltage output circuit 63 (73), for example.

In the example structure, when the forward control has been continued for a certain time period, deviation of the actual detected current value i from the detected current value estimated from the change amount of the PWM signal in the PWM counter control unit 97 is likely to be large owing to the follow-up delay in the high voltage output circuit 63 (73), fluctuation in the electrical load and the like. This may fail to execute the accurate constant current control.

In the example structure, the forward control is continued so as not to cause the above-described failure by executing the reverse control when the accumulated change value Σk reaches the threshold values th5 and th6.

In the aforementioned case, the constant current control with respect to the charged bias voltage Vb to the charged wire 29a, and the sequential transfer bias voltage Va to the transfer roller 30 has been described. However, the constant voltage control with respect to the development bias voltage Vc to the development roller 31 may also be executed quickly and stably based on the similar control.

Figure 8:
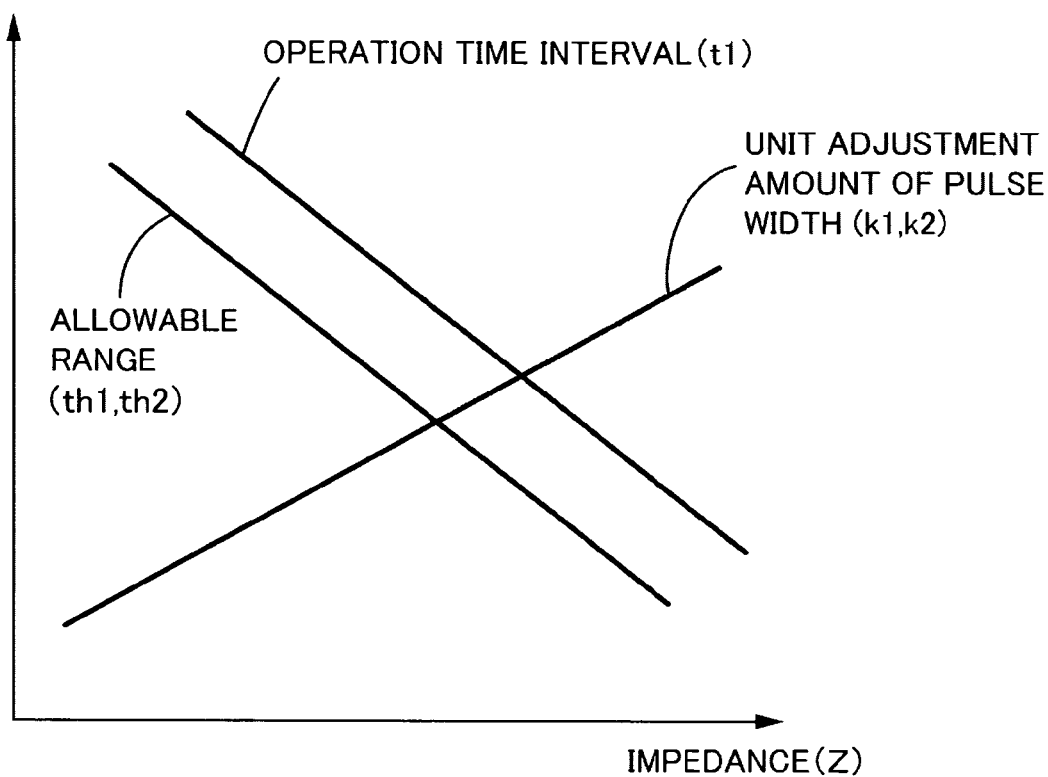
Figure 9:
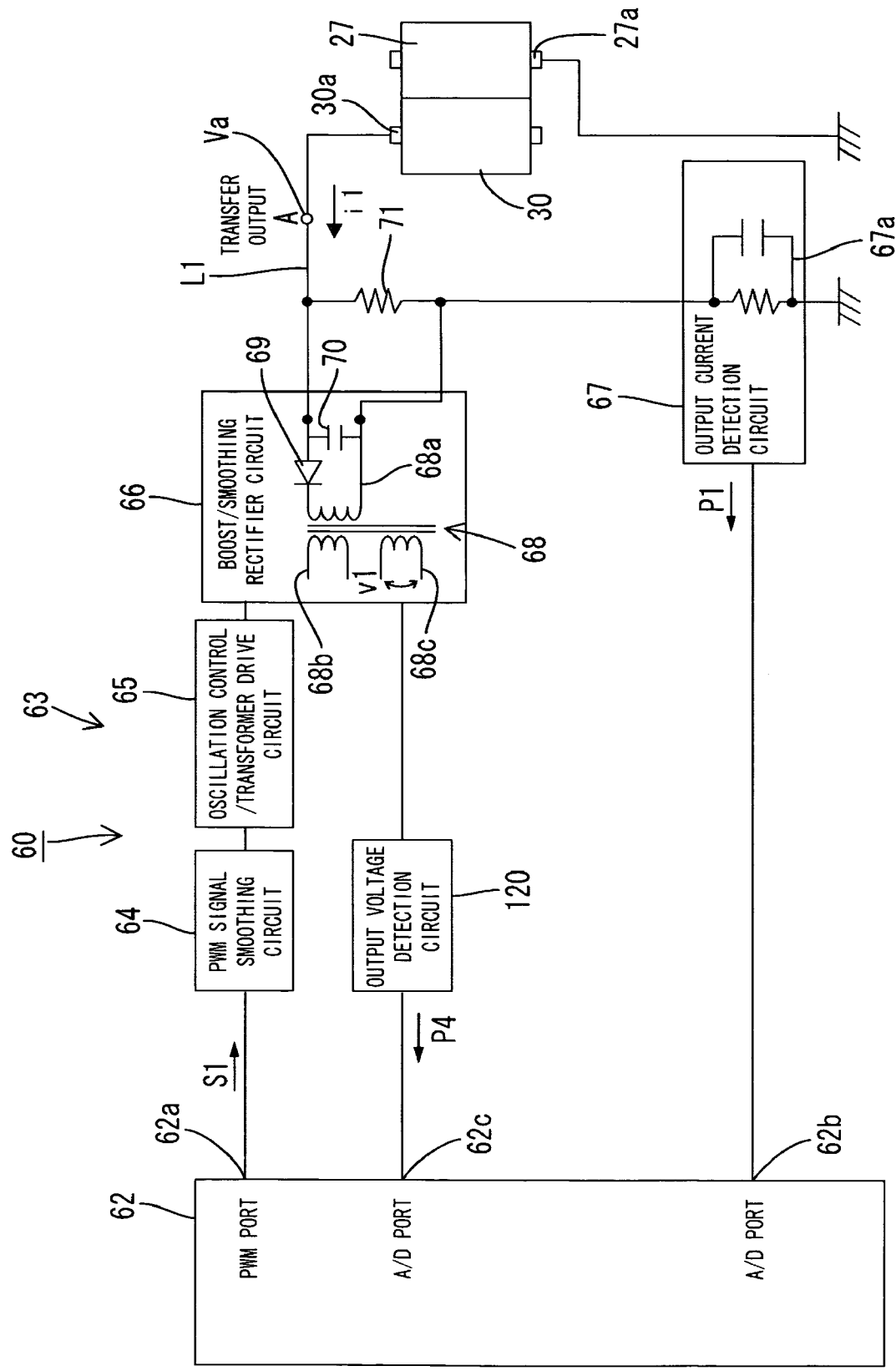
FIG. 9 is a block diagram showing a structure of a portion of a transfer bias application circuit.
Figure 10:
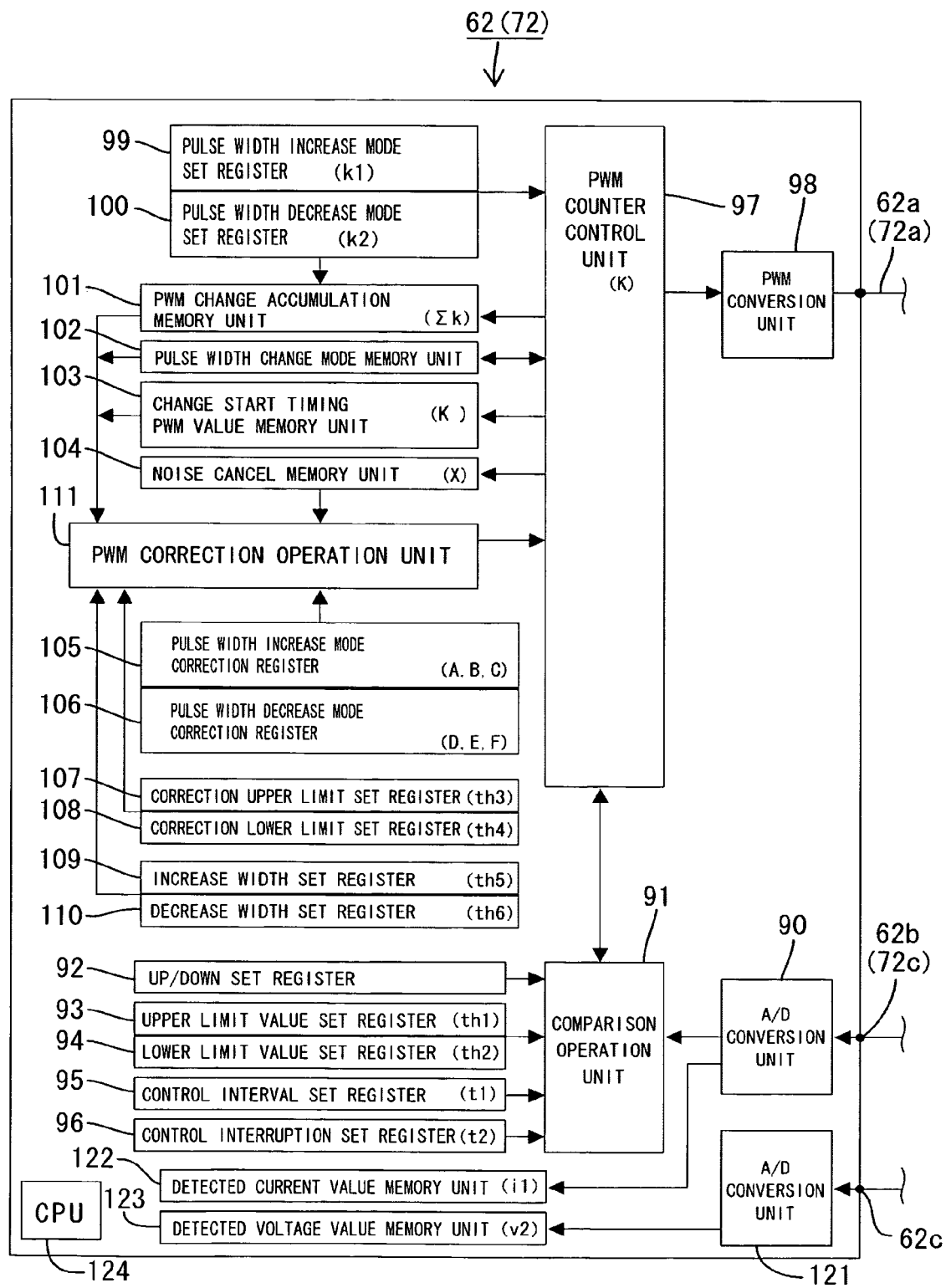
FIG. 10 is a block diagram showing a structure of a portion of the PWM control circuit.

Another example structure is shown in FIGS. 8 to 10. The present structure is substantially the same as that of the previously described structure except that at least one of the control time interval t1, the pulse width increase and decrease values k1 and k2 (unit amount of adjustment for the pulse width adjustment), and an allowable range between the upper limit value th1 and the lower limit value th2 as being fixed in the previously described structure may be changed in accordance with the impedance of the electric load. The same elements of the present structure will be designated with the same reference numerals as those of the previously described structure. The explanation thereof, thus, may be omitted, and only the different portion will be described hereinafter.

The electrical load such as the transfer roller 30 has an impedance variable depending on the environmental change, for example, the ambient temperature. The impedance of the transfer roller 30 varies to the greater degree at the moment when the sheet of paper 3 is inserted into or ejected from the point in contact with the photoconductive drum 27. If the electric load has a small impedance under the current control in the example structure, the amount for adjusting the detected current value to the unit adjustment amount tends to reach the target value at faster rate. In this case, it is preferable to elongate the control time interval t1 as long as possible. Meanwhile, if the impedance of the electric load is large, the amount for adjusting the detected current value to the unit adjustment amount is relatively small, which tends to take a certain time for reaching the target value. In this case, it is preferable to reduce the control time interval t1 as short as possible to realize high speed processing.

In the present structure, the control time interval t1 is changed to be reduced as the impedance of the electric load becomes large as shown in the graph of FIG. 8. Such values as the pulse width increase and decrease values k1 and k2 (unit adjustment amount for the respective pulse width adjustment operations) are changed to be large as the impedance of the electric load becomes large. The allowable range (target value) between the upper limit value th1 and the lower limit value th2 is changed to be reduced as the impedance of the electric load becomes large. The increase and decrease trend of the voltage control will be inverted to the one shown on the graph of FIG. 8.

The structure for measuring the impedance of the electric load will be described taking the transfer bias application circuit 60 as the example. The structure shown in FIG. 9 is substantially the same as that shown in FIG. 2 except that the transfer bias application circuit 60 is provided with an output voltage detection circuit 120 connected between an auxiliary winding 68c of the transformer 68 in the booster and smooth rectifier circuit 66 and the PWM control circuit 62. The PWM control circuit 62 detects an output voltage v1 generated between the PWM control circuit 62 and the auxiliary winding 68c upon the sequential transfer operation performed by the transfer bias application circuit 60. The resultant detection signal S4 is input to the A/D port 62c.

Referring to FIG. 10, the PWM control circuit 62 is formed by adding an A/D conversion unit 121, a detected current value memory unit 122 and a detected voltage value memory unit 123 to the structure shown in FIG. 4. Software processing performed by the CPU 124 (not shown in FIG. 4) in the PWM control circuit 62 allows a detected current value i1 corresponding to the detection signal P1 from the output current detection circuit 67 to be stored in the detected current value memory unit 122. The detected voltage value v1 in accordance with the detection signal P4 from the output voltage detection circuit 120 is stored in the detected voltage value memory unit 123.

In the example structure, the CPU 124 reads the detection signals P1 and P4 in response to the printing request so as to be stored in the detected current value memory unit 122 and the detected voltage value memory unit 123, respectively. It then calculates the present impedance of the transfer roller 30 based on the thus stored detected current value i1 and the detected voltage value v1. The CPU 124 changes values set in the control interval set register 95, the upper limit and lower limit value set registers 93 and 94, the pulse width increase mode set register 99, and the pulse width decrease mode set register 100 such that the changed values correspond with those of the relationship on the graph shown in FIG. 8 with respect to the measured impedance. After changing the set values, the process shown in FIG. 5 is executed.

In the structure, setting in the impedance measurement and the control time interval set register 95 do not have to be changed simultaneously in a single job in response to a single printing request. Such change may be performed at every supply of a sheet of paper 3 to the paper feed tray 6, or at every control time interval t1.

Another structure of the present invention will be shown in FIGS. 11 to 14. In the previous two structures, the pulse width is changed stepwise by the unit adjustment amount (k1, k2) under the forward control. In the present structure, each pulse width of the PWM signals S1, S2, and S3 is changed to the value that allows the detected current value i to be in the allowable range between the upper limit value th1 and the lower limit value th2 (target value) at one time.

Figure 11:
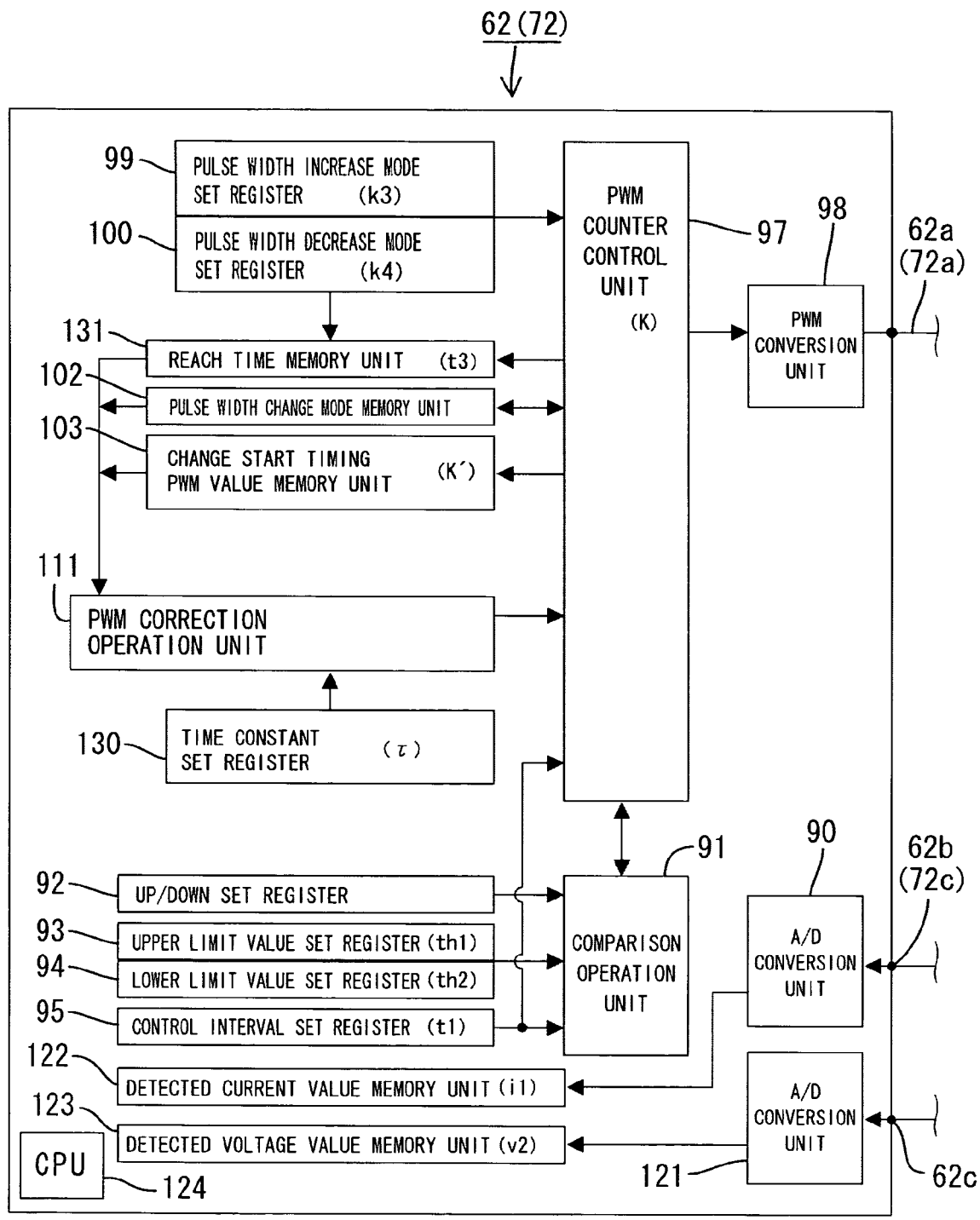
FIG. 11 is a block diagram showing a structure of a portion of the PWM control circuit.

FIG. 11 is a block diagram of an essential portion of the PWM control circuit. The same elements of FIG. 11 as those shown in FIG. 10 will be designated with the same reference numerals, and explanation thereof, thus, will be omitted. Referring to the drawing, in the present structure, a time constant set register 130 that sets time constants τ inherent to the transfer bias application circuit 60 and the charged bias application circuit 61 in place of the registers 105 to 110. The structure further includes a reach time memory unit 131 that updates the reach time t3 taken for the detected current value i to reach the allowable range (target value) between the upper limit value th1 and the lower limit value th2 after execution of the forward control in place of the PWM change accumulation memory unit 101. The explanation will be made taking the transfer bias application circuit 60 having the same structure as that shown in FIG. 9 as the example hereinafter.

The CPU 124 reads the detection signal P1 in response to the printing request so as to be stored in the detected current value memory unit 122 and the detected voltage value memory unit 123, respectively. The stored detected current value i1 and the detected voltage value v1 are used to calculate the present impedance of the transfer roller 30. The CPU 124 changes the values set in the control interval set register 95, the upper limit value set register 93, and the lower limit value set register 94 to the values corresponding to the relationship on the graph shown in FIG. 8 with respect to the measured impedance.

If it is determined that the detected current value i1 deviates from the allowable range as described later, the aforementioned forward control is executed. For example, the pulse width increase and decrease values k3 and k4 corresponding to the difference between the intermediate value between the upper limit value th1 and the lower limit value th2, that is, the final target value and the detected current value i1 are added to the counter value K such that the PWM signal S1 is changed to have the pulse width that allows the detected current value i1 to be in the allowable range. The pulse width increase and decrease values k3 and k4, suitable for the pulse width modulation, may vary depending on the impedance of the electrical load. Then the conversion coefficient for converting the difference between the intermediate value and the detected current value i1 into the pulse width increase and decrease values k3 and k4 is changed in accordance with the measured impedance. Under the current control, the conversion coefficient is changed to the smaller value as the impedance becomes lower, and is changed to the larger value as the impedance becomes higher.

Figure 12:
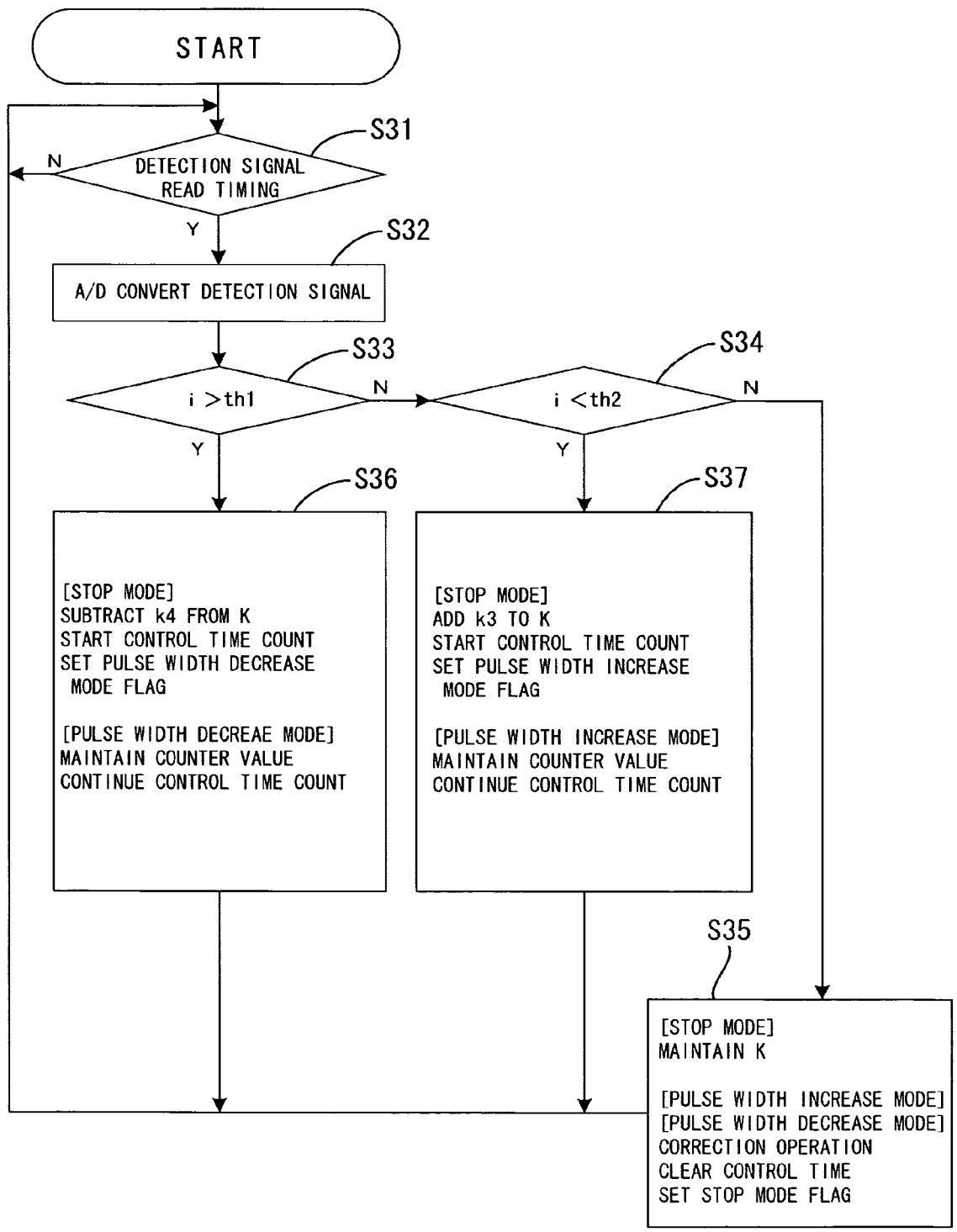
FIG. 12 is a flowchart of a control routine executed in the PWM control circuit.

FIG. 12 is a flowchart of a control routine executed in the PWM control circuit 62. When the CPU 124 activates the PWM control circuit 62 to perform the aforementioned change of setting, the comparison operation unit 91 determines whether it is the time to read the detection signal P1 (control timing) in step S31. Then in step S32, the A/D conversion unit 90 reads the A/D converted detection signal P1 at every control time interval t1.

The comparison operation unit 91 determines whether the detected current value i is in the range between the upper limit value th1 and the lower limit value th2 based on the readout detection signal P1 in steps S33 and S34 sequentially. If it is determined that the detected current value i is in the range between the upper limit value th1 and the lower limit value th2, that is, N is obtained both in steps S33 and S34, the process proceeds to step S35 where only the flag indicating STOP mode is set in the pulse width change mode memory unit 102 such that the PWM counter control unit 97 maintains the present counter value K. In other words, the process returns to step S31 without executing the pulse width adjustment of the PWM signal S1.

(1) Forward Control (a) Detected Current Value Exceeds the Upper Limit Value:

If the detected current value i exceeds the upper limit value th1, that is, Y is obtained in step S33, the process proceeds to step S36. In step S36, if only the flag indicating STOP mode has been set, the pulse width decrease value k4 corresponding to the difference between the intermediate value and the detected current value i1, and the conversion coefficient in accordance with the measured impedance is subtracted from the count value K at a time. Then the time count of the control time starts, and only the flag indicating the pulse width decrease mode is set. The process then returns to step S31. If the same determination result is obtained after the subsequent control time interval t1, the process proceeds to step S36 where the flag indicating the pulse width decrease mode has been already set. Accordingly the counter value K (after the subtraction is maintained as well as the count of the control time (accumulation of the operation time t1).

(b) Detected Current Value is Below the Lower Limit Value

If the detected current value i is below the lower limit value th2, that is, N is obtained in step S33 and Y is obtained in step S34, the process proceeds to step S37. In step S37 where only the flag indicating STOP mode has been set, the difference between the intermediate value and the detected current value i1, and the pulse width increase value k3 corresponding to the conversion coefficient in accordance with the measurement impedance are added to the count value K at a time. Concurrently the control time count is started, and only the flag indicating the pulse width increase mode is set. The process then returns to step S31. If the same determination result is obtained after passage of the subsequent control time interval t1, as the process proceeds to step S37 where the flag indicating the pulse width increase mode has been already set, the counter value K (after the addition) is maintained as it is, and the control time count is continued.

(2) Reverse Control

If the detected current value i is brought into the range between the upper limit value th1 and the lower limit value th2 after execution of the forward control, that is, N is obtained both in steps S33 and S34, the process proceeds to step S35 where the flag indicating the pulse width decrease mode or the flag indicating the pulse width increase mode has been already set. Then the control time is stored as the reach time t3 in the reach time memory unit 131. The PWM correction operation unit 111 calculates the correction values h1 and h2 with respect to the counter value K for changing the pulse width of the PWM signal S1 in the direction opposite to that under the forward control based on the expression described below. At this time, only the flag indicating STOP mode is set.

Pulse width increase mode:

Correction value $h1=(k3)\times[1-e^{\wedge}(-3/\tau)]$; and

Corrected counter value K=initial counter value K'+correction value h1. When the relationship of the corrected counter value K>initial counter value K'−k1 is established, the relationship of the corrected counter value K=initial counter value K'+k1 will be established.

Pulse width decrease mode:

Correction value $h2=(k4)\times[1-e^{\wedge}(-t3/\tau)]$; and

Corrected counter value $K$=initial counter value $K'$−correction value $h2$.

When the relationship of the corrected counter value K>initial counter value K'+k2 is established, the relationship of the corrected counter value K=initial counter value K'−k2 will be established.

Figure 13:
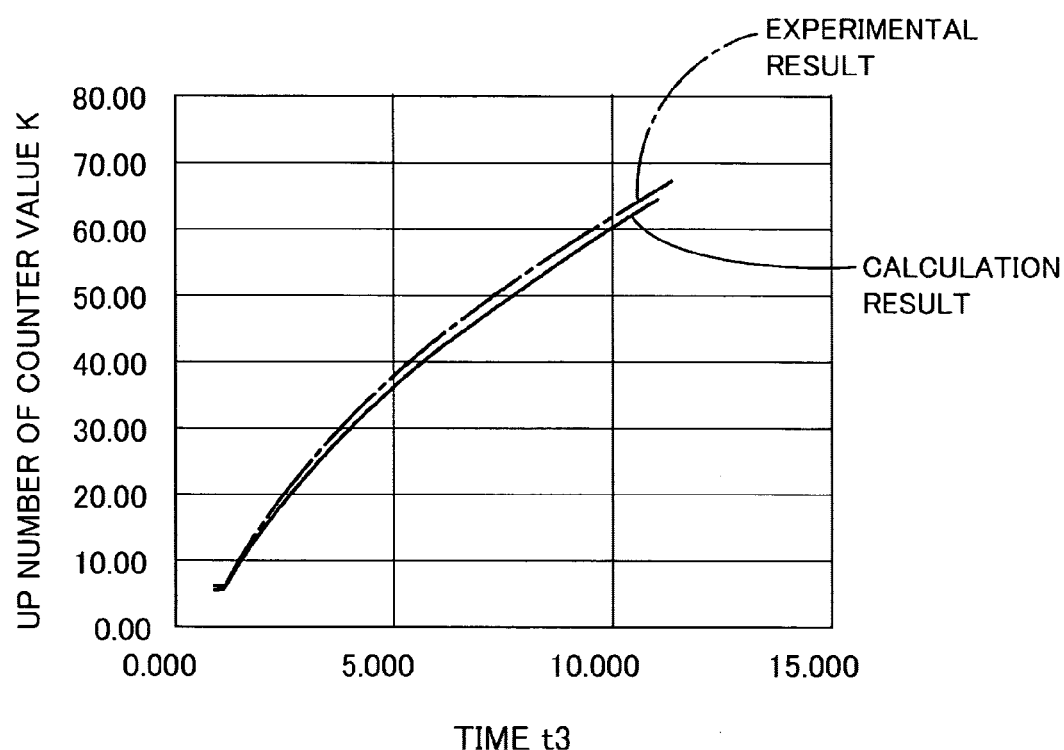
FIG. 13 is a graph showing a relationship between pulse width increase values and time taken for reaching a target value.

FIG. 13 is a graph showing a relationship between the pulse width increase values k3 of the counter value K and the reach time t3 taken for the detected current value i to reach the intermediate value between the upper limit value th1 and the lower limit value th2. Referring to the graph, the dashed line represents the experimental results, and the solid line represents the calculation results of the above expression through approximation of the experimental results. The counter value K that allows the detected current value i upon start of the reverse control is maintained may be derived from the aforementioned expression using the pulse width increase and decrease values k3 and k4, and the reach time t3 taken for the detected current value i to reach the target value from start of the forward control.

Figure 14:
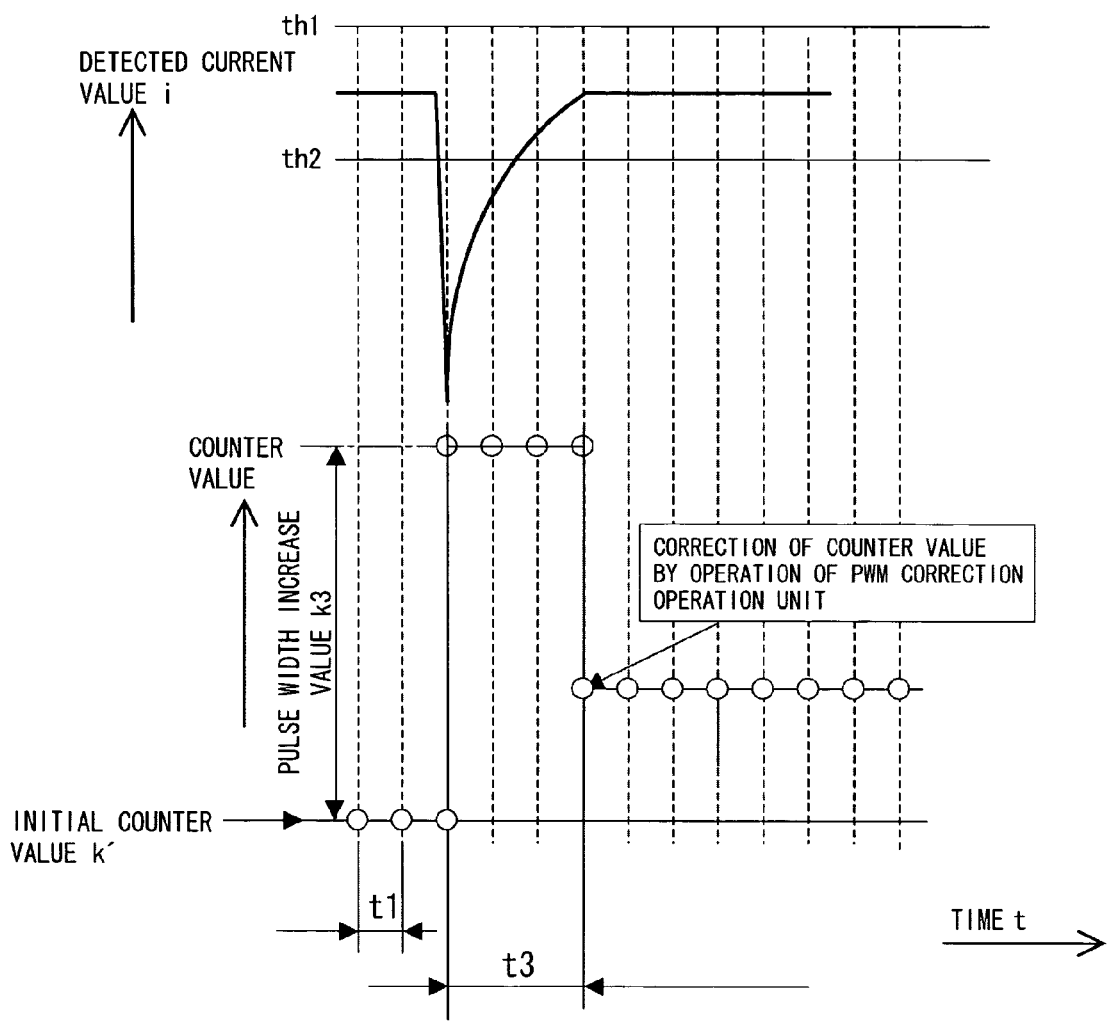
FIG. 14 is an explanatory view showing changes in the counter value and the detected current value under the forward and reverse control modes.

Referring to FIG. 14, in the above-described structure under the forward control, the pulse width increase value k3 is added to the counter value at a time followed by the increase in the detected current value i. The counter value K is maintained until the detected current value i reaches the lower limit value th2. When it reaches the lower limit value th2, the reverse control is executed. In the aforementioned structures for changing the detected current value by a constant unit adjustment amount stepwise, the detected current value i shows the tendency that the change gradually becomes steep. Meanwhile, in the present structure for modulating the PWM signal S1 equivalent to the difference between the detected current value i and the intermediate value under the forward control, the detected current value i shows the tendency that the change gradually becomes gentle. This makes it possible to improve the follow-up capability compared with the structures as described before especially when the detected current value i is close to the target value.

Figure 15:
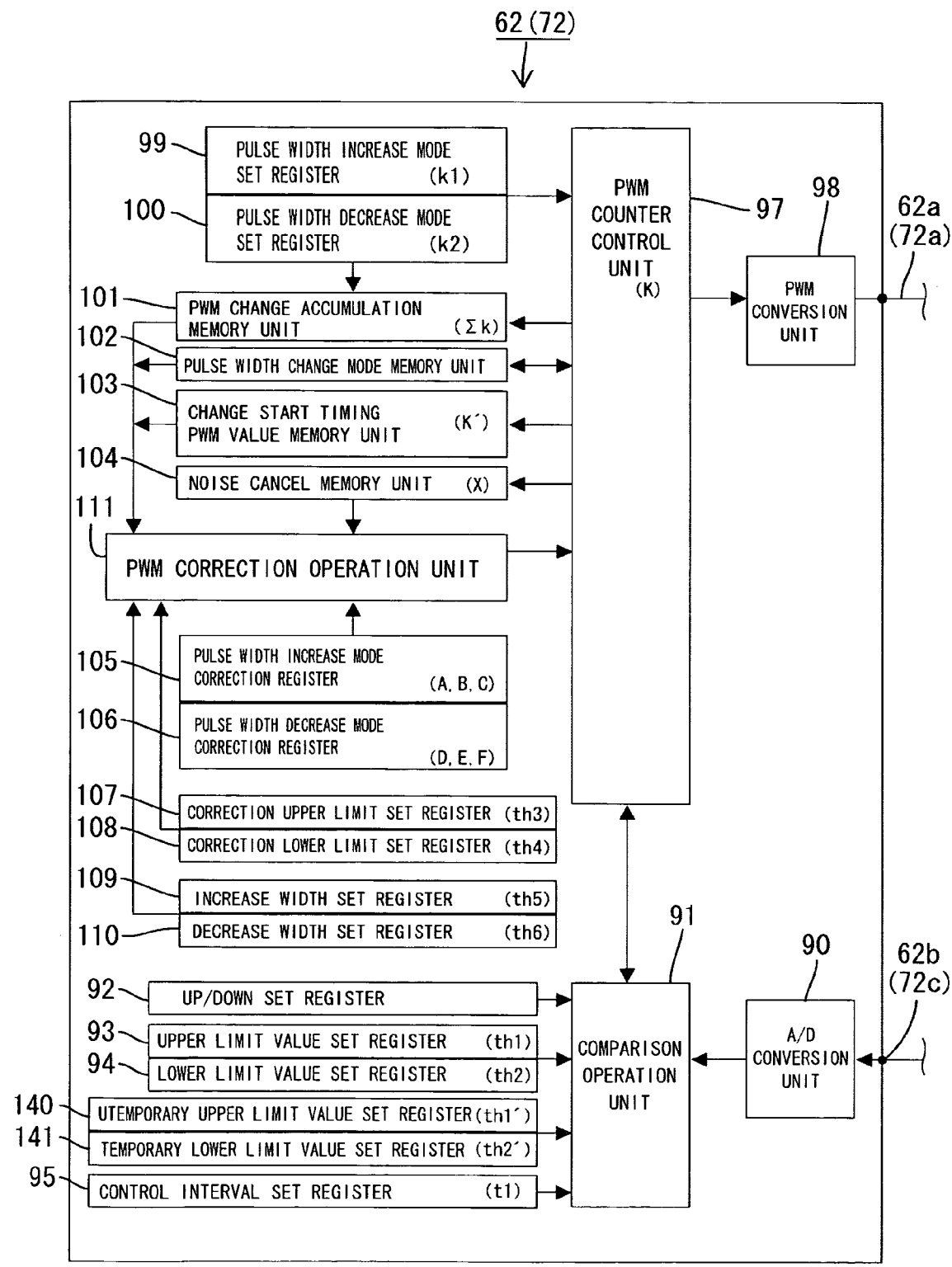
FIG. 15 is a block diagram showing a structure of a portion of the PWM control circuit.
Figure 16:
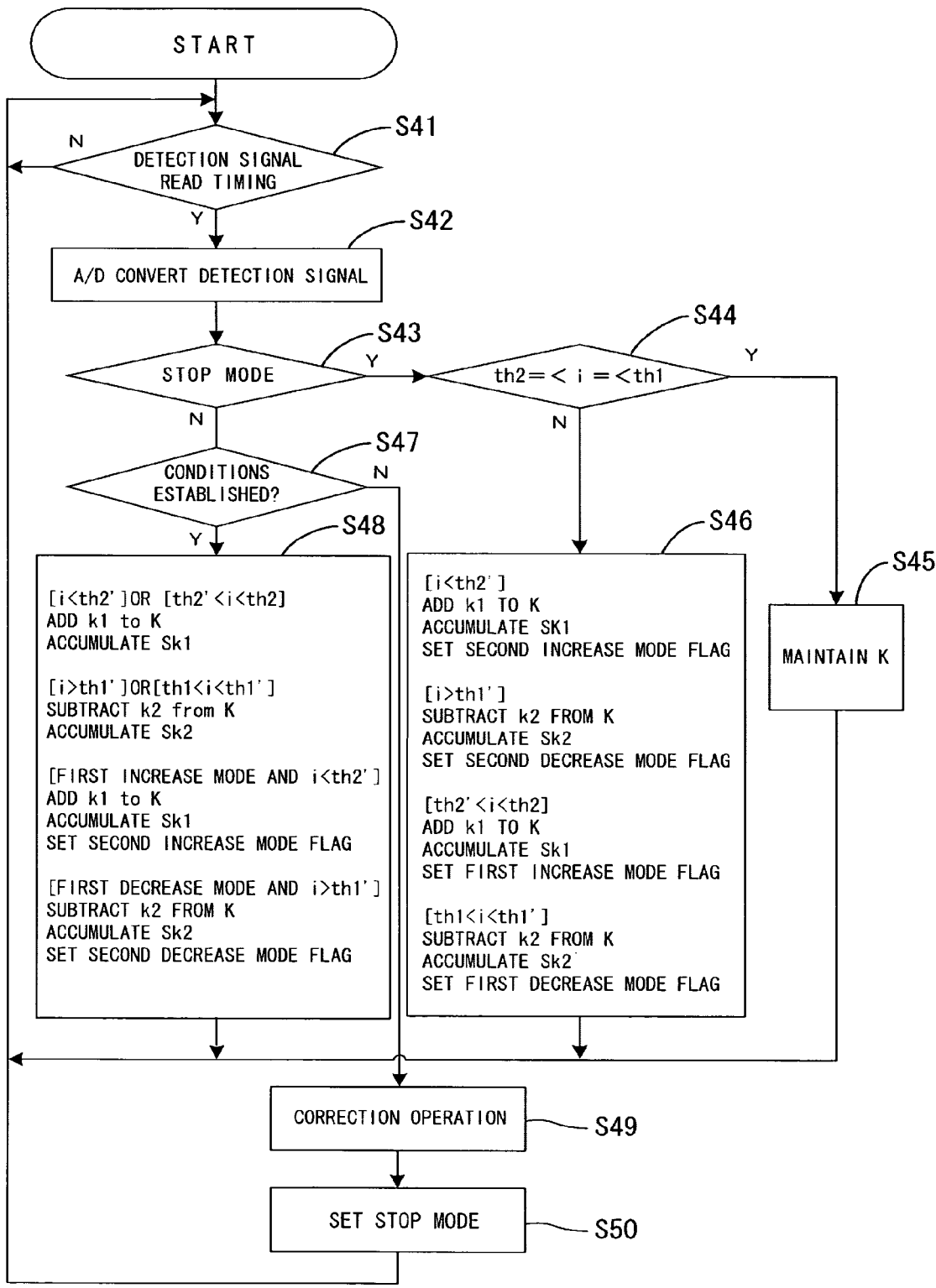
FIG. 16 is a flowchart showing a control routine executed in the PWM control circuit.
Figure 17:
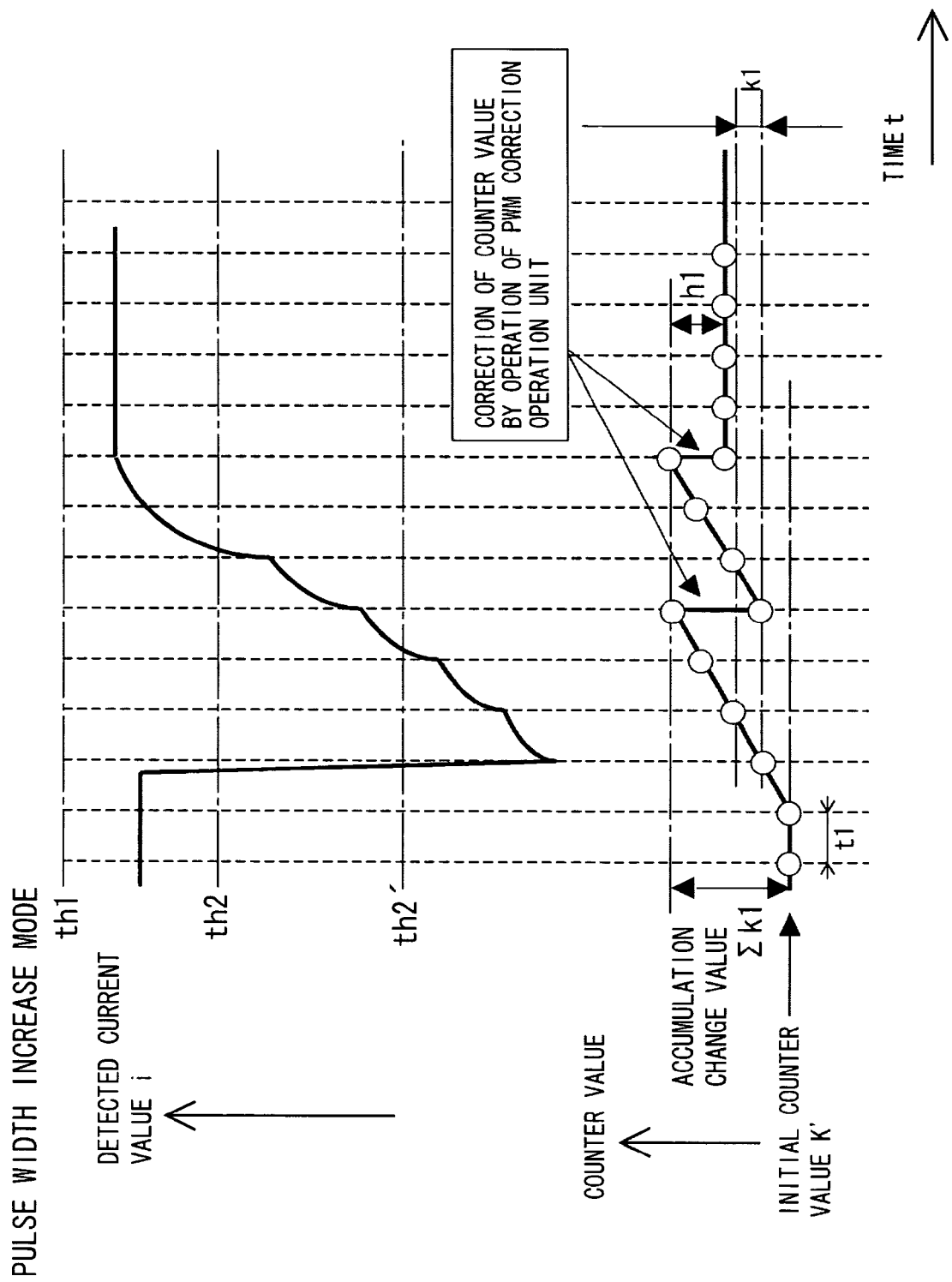
FIG. 17 is an explanatory view showing changes in the counter value and the detected current value under the forward and reverse control modes.

FIGS. 15 to 17 show another structure of the present invention. In the three types of the structures as described above, the reverse control is executed when the detected current value i reaches the allowable range between the upper limit value th1 and the lower limit value th2. In the present structure, the reverse control is executed when the detected current value i reaches the temporary range between the temporary upper limit value th1' larger than the upper limit value th1 and the temporary lower limit value th2' smaller than the lower limit value th2.

FIG. 15 is a block diagram of a portion of the PWM control circuit. The same elements as those shown in FIG. 4 will be designated with the same reference numerals, and explanations thereof, thus will be omitted. Referring to the drawing, in the present structure, a temporary upper limit value set register 140 and a temporary lower limit value set register 141 are provided besides the upper limit value set register 93 and the lower limit value set register 94. The pulse width change mode memory unit 102 stores the mode currently executed by the PWM counter control unit 97 (STOP mode, first increase mode, second increase mode, first decrease mode, and second decrease mode). The explanation will be made taking the transfer bias application circuit 60 having the same structure as that shown in FIG. 2 as an example.

FIG. 16 is a flowchart showing a control routine executed by the PWM control circuit 62. When the CPU activates the PWM control circuit 62, the comparison operation unit 91 determines whether it is the time for reading the detection signal P1 in step S41. Then the detection signal P1 which has been A/D converted by the A/D conversion unit 90 is read at every control time interval t1 in step S42.

In step S43, the PWM counter control unit 97 determines whether the flag indicating STOP mode has been set in the pulse width change mode memory unit 102. As the flag indicating STOP mode has been initially set, that is, Y is obtained in step S43, the process proceeds to step S44. In step S44, the comparison operation unit 91 determines whether the detected current value i is in the allowable range between the upper limit value th1 and the lower limit value th2 based on the detection signal P1 that has been read. If the detected current value i is in the allowable range, that is, Y is obtained in step S44, the process proceeds to step S45 where the currently set counter value K is maintained by the PWM counter control unit 97. In other words, the process returns to step S41 without performing the pulse width adjustment with respect to the PWM signal S1.

Likewise the aforementioned structures, in the present structure, if the detected current value i is not in the range between the upper limit value th1 and the lower limit value th2, the pulse width adjustment for increasing or decreasing the currently set counter value K by a predetermined amount at every control time interval t1 is performed repeatedly so as to execute the forward control where the detected current value i is brought to be close to the range between the upper limit value th1 and the lower limit value th2.

If the detected current value i is not in the range between the upper limit value th1 and the lower limit value th2, that is, Y is obtained in step S43 and N is obtained in step S44, the PWM counter control unit 97 executes the processes (a) to (d) as follows.

(a) If the detected current value i is smaller than the temporary lower limit value th2', the pulse width increase value k1 is added to the counter value K to obtain the accumulation change value Σk1 so as to be written and updated in the PWM change accumulation memory unit 101. Only the flag indicating the second increase mode is set.

(b) If the detected current value i is larger than the temporary higher limit value th1', the pulse width decrease value k2 is subtracted from the counter value K to obtain the accumulation change value Σk2 so as to be written and updated in the PWM change accumulation memory unit 101. Only the flag indicating the second decrease mode is set.

(c) If the detected current value i is larger than the temporary lower limit value th2', and smaller than the lower limit value th2, the pulse width increase value k1 is added to the counter value K to obtain the accumulation change value Σk1 so as to be written and updated in the PWM change accumulation memory unit 101. Then only the flag indicating the first increase mode is set.

(d) If the detected current value i is smaller than the temporary upper limit value th1', and larger than the upper limit value th1, the pulse width decrease value k2 is subtracted from the counter value K to obtain the accumulation change value Σk2 so as to be written and updated in the PWM change accumulation memory unit 101. Then only the flag indicating the first decrease mode is set.

As at least one of the flags indicating the first increase mode, second increase mode, first decrease mode and the second decrease mode is set in step S46, N is obtained in step S43 at the subsequent control timing. The process then proceeds to step S47. In step S47, it is determined whether conditions specified in step S48 are established. If the conditions are established, that is, Y is obtained in step S47, the process proceeds to step S48. In step S48, likewise the previous control timing, if the detected current value i is held below the temporary lower limit value th2', or equal to or larger than the temporary lower limit value th2' and below the lower limit value th2, the operation at the currently set mode (increasing the counter value K) is continued. Likewise the previous control timing, if the detected current value i is held in excess of the temporary upper limit value th1', or equal to or smaller than the temporary upper limit value th1' and in excess of the upper limit value th1, the operation at the currently set mode (decreasing the counter value K) is continued.

In the case where the detected current value i is below the temporary lower limit value th2' during setting of the first increase mode owing to fluctuation in the impedance of the electric load to the greater degree, the mode is changed to the second increase mode while continuing the operation to increase the counter value K. In the case where the detected current value i exceeds the temporary upper limit value th2' during setting of the first decrease mode, the mode is changed to the second decrease mode while continuing the operation to decrease the counter value K.

If the conditions specified in step S48 are not established in step S47, that is, N is obtained in step S47, the process proceeds to step S49 where the correction operation (same process as in step S17 of FIG. 5) is executed. Then in step S50, the flag indicating STOP mode is set, and the process returns to step S41. When the detected current value i exceeds the upper limit value th1, the temporary upper limit value th1', the lower limit value th2, or the temporary lower limit value th2', for example, like conditions (e) to (h) as described below in the direction where the detected current value i is adjusted to reach the target value, it is considered that the conditions specified in step S48 are not established.

(e) The detected current value i is equal to or larger than the temporary lower limit value th2', and below the lower limit value th2 while the flag indicating the second increase mode is set.

(f) The detected current value i is equal to or larger than the lower limit value th2, and equal to or smaller than the upper limit value th1 while the flag indicating the first increase mode is set.

(g) The detected current value i exceeds the upper limit value th1, and equal to or smaller than the temporary upper limit value th1' while the flag indicating the second decrease mode is set.

(h) The detected current value i is equal to or larger than the lower limit value th2, and equal to or smaller than the upper limit value th1 while the flag indicating the first decrease mode being set.

In the aforementioned structure, the forward control is started as shown in FIG. 17. At the timing when the detected current value i reaches the temporary lower limit value th2' or exceeds the temporary lower limit value th2' upon start of the forward control, the first reverse control is executed in step S49. Then the PWM signal S1 is modulated (having the count value K subtracted) to the pulse width that allows the detected current value i level to be maintained. As the detected current value i is still out of the allowable range, the forward control starts again. At the control timing when the detected current value i reaches the lower limit value th2, or exceeds the lower limit value th2, the second reverse control is executed in step S49.

Execution of the reverse control before the detected current value i reaches the allowable range allows the detected current value i to gently reach the allowable range, resulting in smooth control.

Figure 18:
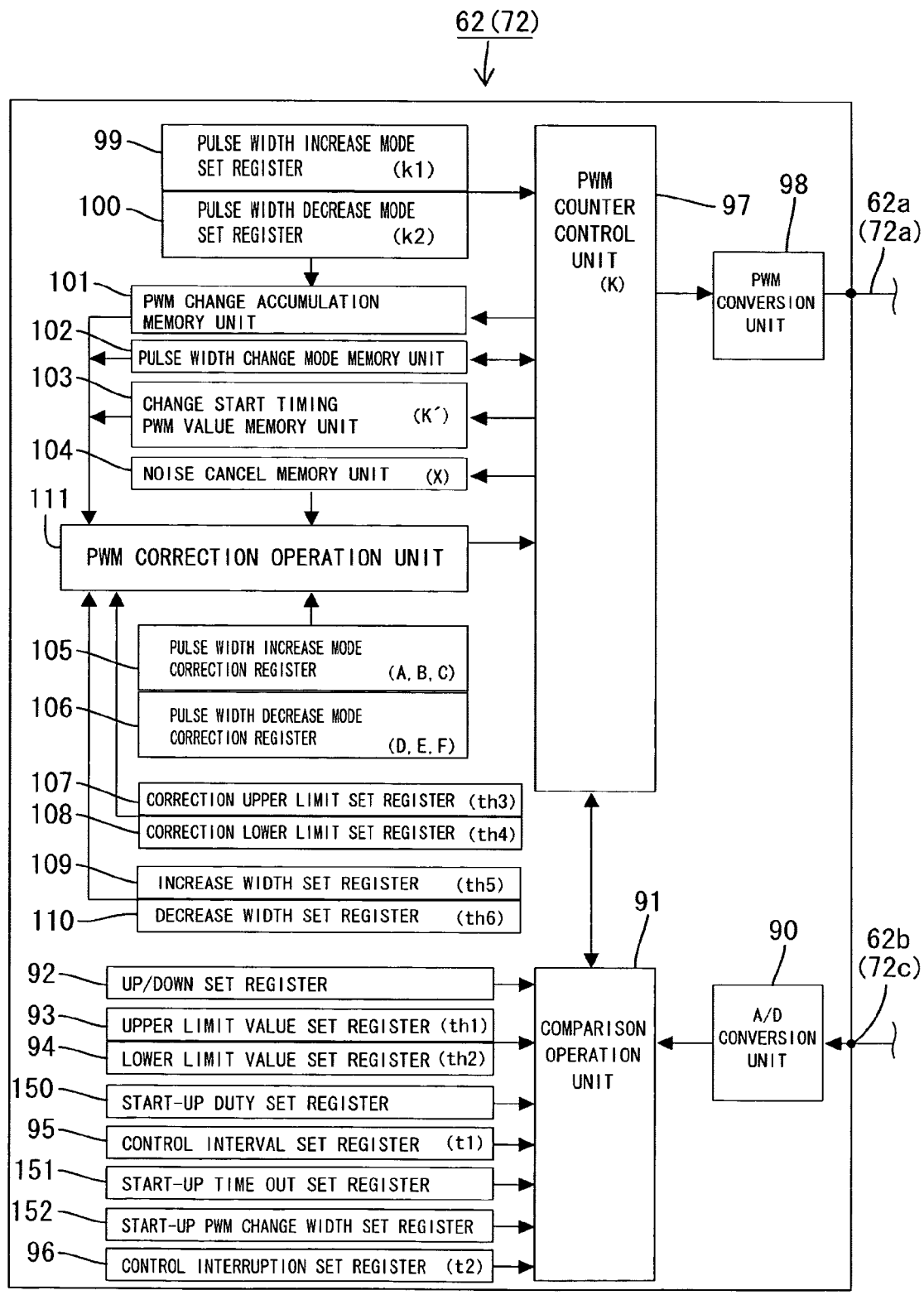
FIG. 18 is a block diagram showing a structure of a portion of the PWM control circuit.
Figure 19:
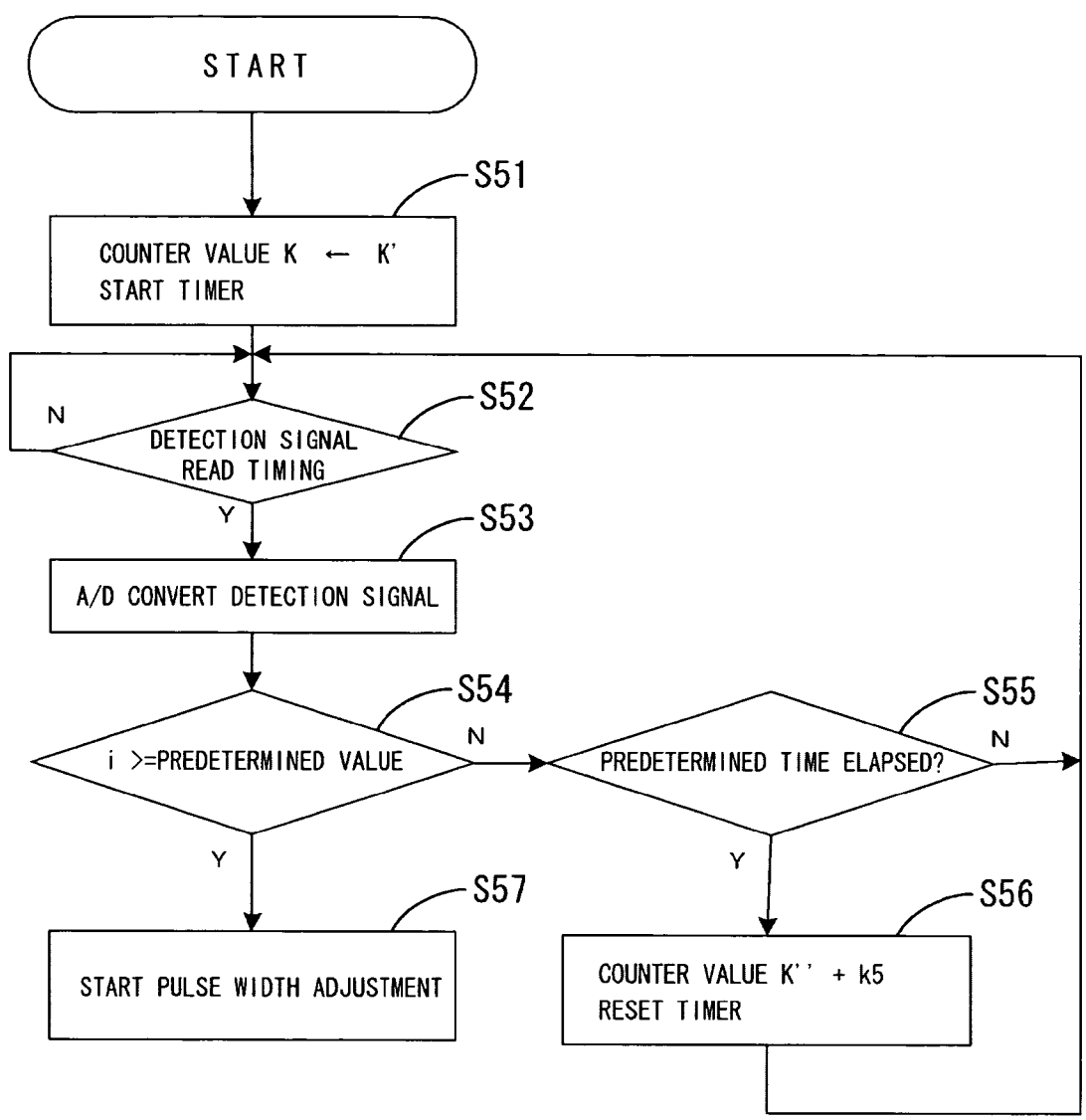
FIG. 19 is a flowchart showing a control routine executed in the PWM control circuit.

Another structure of the present invention is shown in FIGS. 18 and 19.

In the case where the charged bias application circuit 61 performs the current control with respect to the development bias voltage Vc to the development roller 31, the operation for increasing (decreasing) the PWM signal S3 is started upon the command for starting power supply. The transistor 86c is not activated until the pulse width is increased (decreased) to a certain degree, and accordingly the power supply to the development roller 31 is not started. If the pulse width adjustment operation (FIGS. 5, 12, 16, and 21 to be described later) with respect to the PWM signal S3 is performed in the aforementioned period, the power supply control may not be normally executed.

In the present structure, the pulse width adjustment is started after the transistor 86c is activated to sufficiently reflect the PWM control based on the PWM signal S3 on the development bias voltage Vc. FIG. 18 is a block diagram of an essential portion of the PWM control circuits 62 and 72.

The same elements as those shown in FIG. 4 are designated with the same reference numerals, and the explanation thereof, thus, may be omitted. The structure includes a start-up duty set register 150 that sets a start-up count value K'''' (corresponding to the "fixed pulse width" in the present invention), a start-up time out set register 151 that sets a predetermined time t4 to be described later, and a start-up PWM change width set register 152 that sets the start-up modulation value k5 to be described later.

In response to reception of an input of a power supply start command signal, the PWM control circuits 62 and 72 execute the control routine shown in the flowchart of FIG. 19. In step S51, the counter value K is set to the start-up count value K'''', and the timer count (for example, accumulation of the control time interval t1) is started. In step S52, the comparison operation unit 91 determines whether it is the time to read the detection signal P1 (P2), that is, the control timing. Then in step S53, the detection signal P1 (P2) that has been A/D converted by the A/D conversion unit 90 is read at every control time interval t1.

In step S54, it is determined whether the detected current value i is equal to or larger than a predetermined value (for example, the detected current value i obtained when the transistor 86c is activated). If it is not equal to or larger than the predetermined value, that is, N is obtained in step S54, the process proceeds to step S55. In step S55, it is determined whether the time counted by the timer reaches the predetermined time t4. If the time has not reached the predetermined time t4, that is, N is obtained in step S54, the process returns to step S52. If the detected current value fails to be equal to or larger than the predetermined value even after the elapse of the predetermined time, that is, N is obtained in step S54, and Y is obtained in step S55. The process proceeds to step S56 where the start-up modulation value k5 is added to the currently set count value K''''. The timer is reset to resume the timer count, and the process returns to step S52. At the control timing when the detected current value i becomes equal to or larger than the predetermined value, that is, Y is obtained in step S54, the process makes the transition to the pulse width adjustment operation as shown in FIG. 5 in step S57.

In the aforementioned structure, execution of the pulse width adjustment operations is started after the supply of power in accordance with the pulse width of the PWM signal S3 to the electrical load. This makes it possible to execute highly accurate control.

Figure 20:
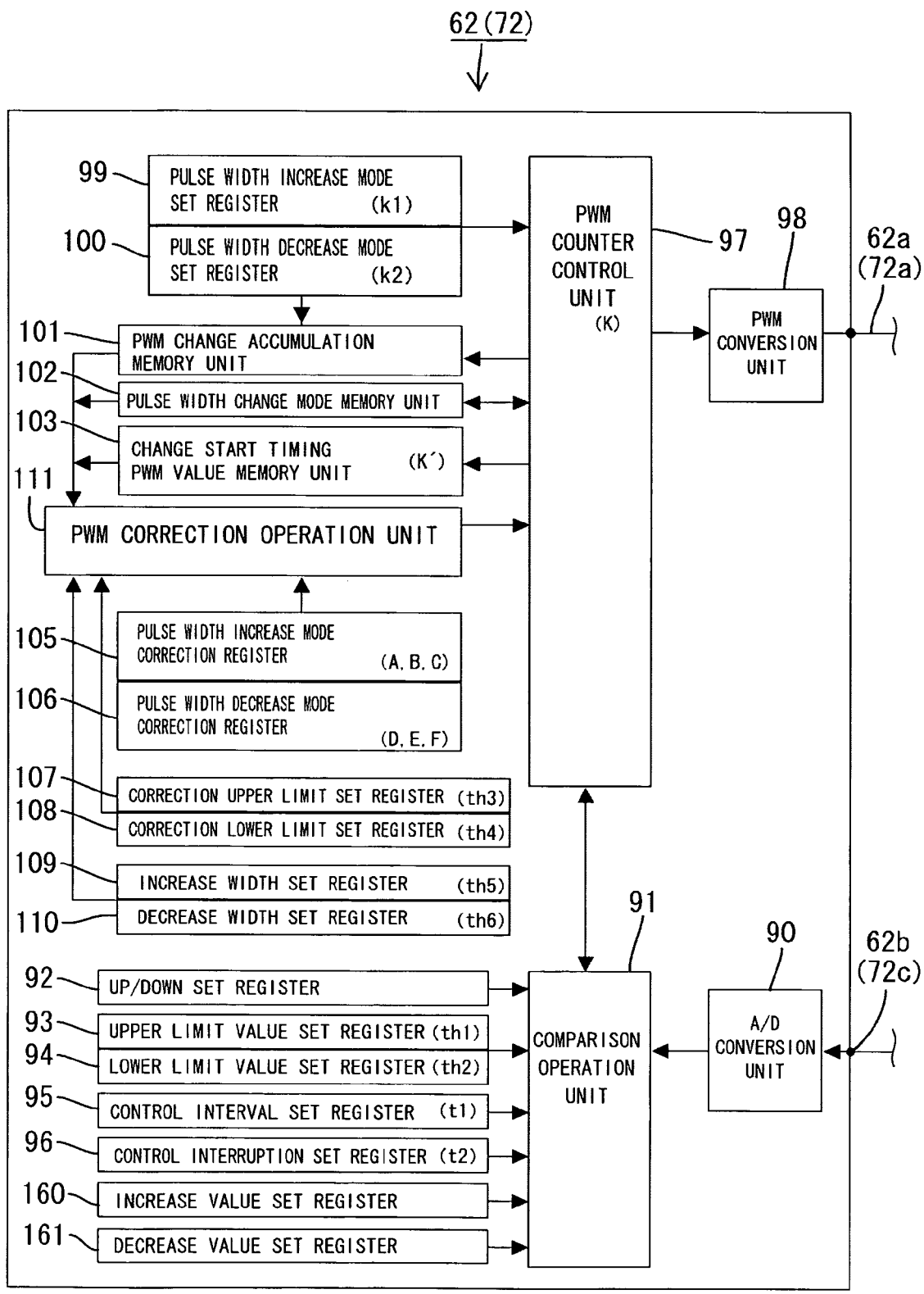
FIG. 20 is a block diagram showing a structure of a portion of the PWM control circuit.
Figure 21:
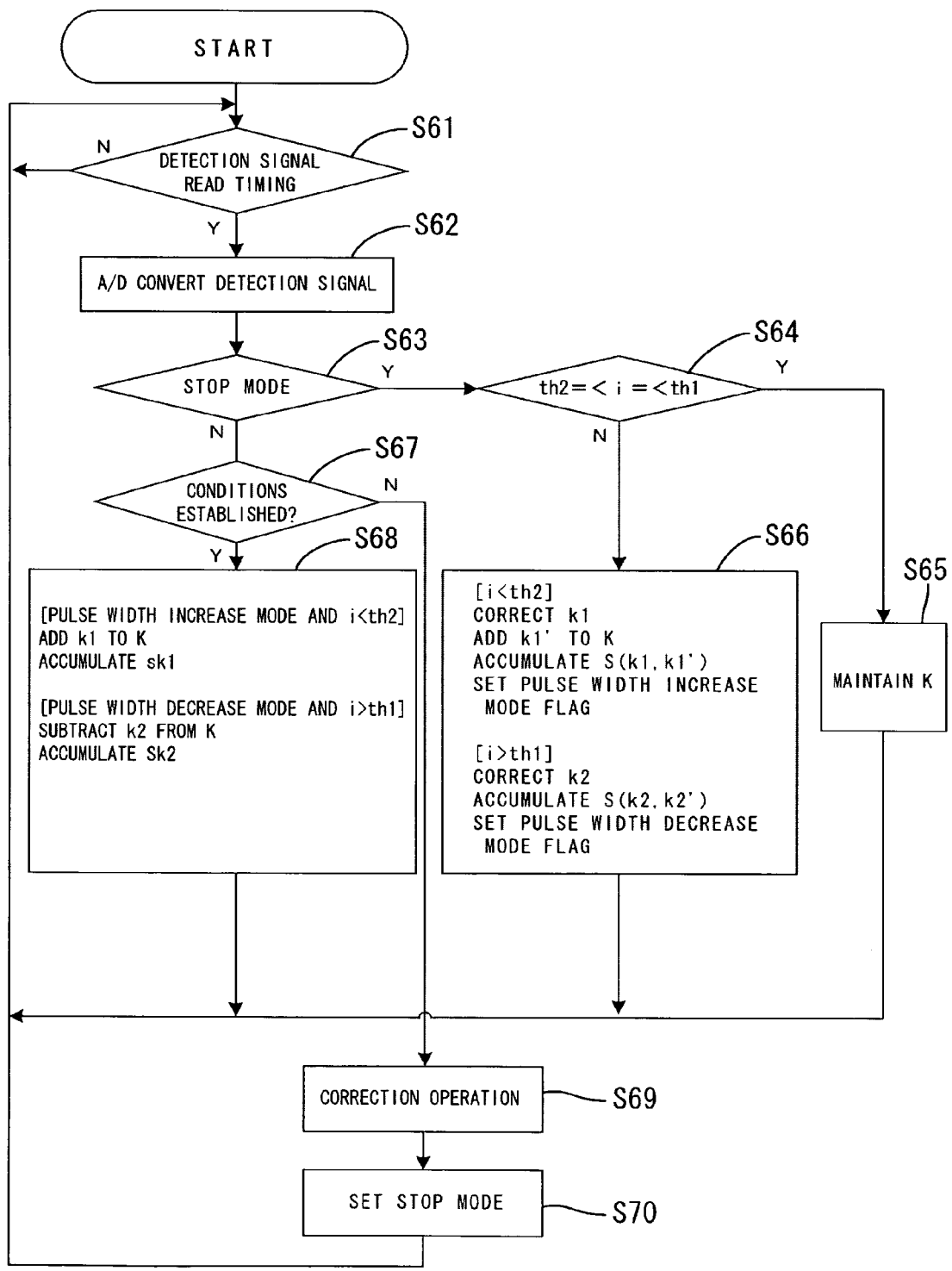
FIG. 21 is a flowchart showing a control routine executed in the PWM control circuit.

Another structure of the present invention is shown in FIGS. 20 and 21. In the structure, the pulse width increase value k1 and the pulse width decrease value k2 are increased depending on the difference between the detected current value i and the target value.

FIG. 20 is a block diagram of of the PWM control circuit. The same elements as those shown in FIG. 4 are designated as the same reference numerals, and explanation thereof, thus, will be omitted. Referring to the drawing, the present structure includes an increase value set register 160 that sets a reference pulse width increase value k1' used in the expression to be described later, and a decrease value set register 161 that sets a reference pulse width decrease value k2'.

FIG. 21 is a flowchart of a control routine executed by the PWM control circuit 62 (72). When the CPU activates the PWM control circuit 62, the comparison operation unit 91 determines whether it is the time for reading the detection signal P1 in step S61. Then in step S62, the detection signal P1 that has been A/D converted by the A/D conversion unit 90 is read at every control time interval t1.

In step S63, it is determined by the PWM counter control unit 97 whether the flag indicating STOP mode has been set in the pulse width change mode memory unit 102. As the flag indicating STOP mode is set at the initial step, Y is obtained in step S63. Then in step S64, the comparison operation unit 91 determines whether the detected current value i is in the allowable range between the upper limit value th1 and the lower limit value th2 based on the readout detection signal P1 that has been read. If the detected current value i is in the allowable range, that is, Y is obtained in step S64, the process proceeds to step S65 where the currently set counter value K is maintained by the PWM counter control unit 97. In other words, the process returns to step S 61without executing the pulse width adjustment with respect to the PWM signal S1.

Meanwhile, if the detected current value i is not in the allowable range, that is, N is obtained in step S64, the process proceeds to step S66 where the correction operation of the pulse width increase value k1 and the pulse width decrease value k2 is performed using the expression as described below.

Detected current value i<lower limit value th2:

Pulse width increase value $k1$=reference pulse width increase value $k1'$+reference pulse width increase value $k1' \times [1-(\text{detected current value } i/\text{lower limit value } th2)]$ Detected current value i>upper limit value th1:

Pulse width decrease value $k2$=reference pulse width decrease value $k2'$+reference pulse width decrease value $k2' \times [1-(\text{detected current value } i/\text{upper limit value } th1)]$.

The corrected pulse width increase value k1 and the pulse width decrease value k2 are accumulated to the accumulation change value. Only the flag indicating the pulse width increase mode, or only the flag indicating the pulse width decrease mode is set. The process then returns to step S61.

As the flag indicating the pulse width increase mode or the pulse width decrease mode has been already set at the subsequent control timing, N is obtained in step S63. The process then proceeds to step 67 where it is determined whether conditions specified in step S68 are established. If those conditions are established, that is, Y is obtained in step S67, the process proceeds to step S68. In step S68, likewise the previous control timing, if the detected current value i is held below the lower limit value th2, the operation at the currently set mode (increasing the counter value K) is continued. Likewise the previous control timing, if the detected current value i is held in excess of the upper limit value th1, the operation at the currently set mode (decreasing the counter value K) is continued. The process then returns to step S61.

If the conditions specified in step S68 are not established in step S67, that is, N is obtained in step S67, the process proceeds to step S69 where the arithmetic correction operation (same process as step S17 shown in FIG. 5) is executed. Then in step S70, only the flag indicating STOP mode is set, and the process returns to step S61. When the detected current value i exceeds the upper limit value th1 or the lower limit value th2, like conditions (i) and (j) as described below where the detected current value i is adjusted to reach the target value, it is considered that the conditions specified in step S48 are not established.

(i) The detected current value i is below the lower limit value th2 while the flag indicating the pulse width increase mode is set.

(j) The detected current value i exceeds the upper limit value th1 while the flag indicating the pulse width decrease mode is set.

In the aforementioned structure, the pulse width increase value k1 and the pulse width decrease value k2 are changed in accordance with the difference between the detected current value i and the target value so as to improve the follow-up performance.

It is to be understood that the present invention is not limited to the structures described above and referring to the drawings. The following forms may be considered as being within the scope of the present invention.

In the aforementioned structures, the laser printer 1 is taken as the example of the image forming apparatus. However, the power supply device for supplying power while executing the PWM control may provide similar effects to devices other than image forming apparatuses.

In the aforementioned structures, the transfer roller 30, charged wire 29a and development roller 31 are described as the electric load to which the present invention is applied for executing the power supply control. The present invention may also be applied to the control of the cleaning bias voltage to the cleaning brush 53, for example.

In the aforementioned structures, the reverse control is executed, if it is determined, twice consecutively at the control time interval after execution of the forward control, that the detected current value i is in the range between the upper limit value th1 and the lower limit value th2, exceeds the upper limit value th1 from the point equal to or smaller than the upper limit value th1, or is below the lower limit value th2 from the point equal to or larger than the lower limit value th2. However, the reverse control may be executed when the aforementioned states are consecutively determined three or more times.

In the aforementioned structures, the characteristic graphs may be linearized by gradually changing the readout timing of the detection signal or the pulse width increase value k1 and the pulse width decrease value k2 to be increased or decreased. This makes it possible to simplify the calculation, allowing for high speed control.

Upon start-up of the forward control, the follow-up delay tends to occur owing to fluctuation in the load, especially of the electrical loads. In the aforementioned structures, the pulse width increase value k1 and the pulse width decrease value k2 (unit adjustment amount) are increased during the pulse width adjustment operation under the forward control, so as to allow the detected current value i to quickly reach the range between the upper limit value th1 and the lower limit value th2. For example, two pairs of the pulse width increase mode set registers 99 and the pulse width decrease mode set registers 100 are prepared such that relatively large pulse width increase value k1 and the pulse width decrease value k2 in the first pair of the pulse width increase mode set register 99 and the pulse width decrease mode set register 100 are used to execute the pulse width adjustment operation until a certain number of cycles (specifically, the first cycle) from the start of the forward control. Thereafter (specifically, the second and subsequent cycles), the relatively small pulse width increase value k1 and the pulse width decrease value k2 set in the second pair of the pulse width increase mode set register 99 and the pulse width decrease mode set register 100 are used to execute the pulse width adjustment operation.

In the structure shown in FIGS. 15 to 17, the reverse control is executed once before the detected current value i reaches the allowable range. Alternatively the temporary range may be provided in stages so as to allow the reverse control twice or more before the detected current value i reaches the allowable range. The structure in which the reverse control is executed before the detected current value i reaches the allowable range may be applied to one of the structures described above to provide similar effects.

In the structure shown in FIGS. 18 and 19, the pulse width adjustment operation (forward control, reverse control) is allowed based on the determination whether the detected current value i is equal to or a predetermined value. Alternatively, it may be structured to allow the pulse width adjustment operation after an elapse of a predetermined time period from the input of the power supply start-up command signal.

The invention claimed is:

1. A power supply device comprising:
    a PWM signal generation circuit that generates a PWM signal;
    a control power supply circuit that supplies power in accordance with said PWM signal to an electric load;
    a detection unit that detects one of a supply voltage value and a supply current value of power supplied to said electric load;
    a determination unit that determines a deviation of a detection value detected by said detection unit from a target value; and
    a pulse width control unit capable of executing a forward control to change a pulse width of said PWM signal in a direction where said detection value is brought to be close to said target value, and a reverse control to change said pulse width of said PWM signal in a direction opposite to that of said forward control, wherein said pulse width control unit executes said forward control when said determination unit determines that said deviation exists, and then executes said reverse control when said determination unit makes at least one of determinations that said deviation does not exist, and a magnitude relationship between said detection value and said target value is inverted.

2. The power supply device according to claim 1, wherein said pulse width control unit repeatedly changes said pulse width of said PWM signal by a unit adjustment amount stepwise under said forward control in a direction where said detection value is brought to be close to said target value.

3. The power supply device according to claim 2, wherein said pulse width control unit readouts a determination result of said determination unit at a predetermined control time interval, and performs a pulse width adjustment that changes said pulse width of said PWM signal by said unit adjustment amount at an elapse of said control time interval under said forward control.

4. The power supply device according to claim 3, further comprising a first change unit that changes at least one of said control time interval and said unit adjustment amount.

5. The power supply device according to claim 4, wherein said first change unit changes at least one of said control time interval and said unit adjustment amount based on a difference between said detection value and said target value.

6. The power supply device according to claim 4, wherein said first change unit changes at least one of said control time interval and said unit adjustment amount when it is sequentially determined at an elapse of said control time interval that a difference between said detection value and said target value is equal to or smaller than a predetermined value.

7. The power supply device according to claim 4, further comprising an impedance measurement unit that measures an impedance of said electric load, wherein said first change unit changes at least one of said control time interval and said unit adjustment amount in accordance with a value of said impedance of said electric load.

8. The power supply device according to claim 5, further comprising an impedance measurement unit that measures an impedance of said electric load, wherein said first change unit changes at least one of said control time interval and said unit adjustment amount in accordance with a value of said impedance of said electric load.

9. The power supply device according to claim 6, further comprising an impedance measurement unit that measures an impedance of said electric load, wherein said first change unit changes at least one of said control time interval and said unit adjustment amount in accordance with a value of said impedance of said electric load.

10. The power supply device according to claim 6, wherein said first change unit changes at least one of said control time interval and said unit adjustment amount conforming to a timing at which an impedance of said electric load changes.

11. The power supply device according to claim 4, wherein said first change unit makes said unit adjustment amount at a start of said forward control larger than said unit adjustment amount subsequent to said start of said forward control.

12. The power supply device according to claim 2, wherein:
said target value is set to have an allowable range between an upper limit value and a lower limit value; and
said pulse width control unit makes said unit adjustment amount under said forward control smaller than an amount of change of said pulse width corresponding to a difference between said upper limit value and said lower limit value of said detection value.

13. The power supply device according to claim 11, further comprising a first determination unit that determines an amount of change of said pulse width under said forward control based on a difference between said detection value and said target value.

14. The power supply device according to claim 11, further comprising an impedance measurement unit that measures an impedance of said electric load, and a second determination unit that determines an amount of change of a pulse width under said forward control based on said impedance.

15. The power supply device according to claim 12, further comprising an impedance measurement unit that measures an impedance of said electric load, and a second determination unit that determines an amount of change of a pulse width under said forward control based on said impedance.

16. The power supply device according to claim 1, wherein in response to a determination made by said determination unit that a deviation exists, said pulse width control unit changes a pulse width of said PWM signal to a value that allows said detection value to reach said target value under said forward control, and maintains said pulse width until said detection value reaches said target value.

17. The power supply device according to claim 1, wherein said pulse width control unit readouts a determination result of said determination unit at a predetermined control time interval, and executes said reverse control when said detection value reaches said target value at a plurality of sequential control timings.

18. The power supply device according to claim 2, wherein said pulse width control unit executes said reverse control when a pulse width of said PWM signal reaches a predetermined pulse width under said forward control.

19. The power supply device according to claim 1, wherein said pulse width control unit executes said reverse control when a total change amount of a pulse width of said PWM signal under said forward control from a start of said forward control reaches a predetermined value.

20. The power supply device according to claim 19, wherein said pulse width control unit determines a change amount of a pulse width under said reverse control based on an expression using said total change amount and a pulse width of said PWM signal at a start of said forward control as a variable.

21. The power supply device according to claim 1, wherein said pulse width control unit determines a change amount of a pulse width under said reverse control based on said total change amount under said forward control as a variable.

22. The power supply device according to claim 1, wherein said pulse width control unit changes a pulse width of said PWM signal under said reverse control to a value such that said detection value at a start of said reverse control is maintained.

23. The power supply device according to claim 1, wherein said pulse width control unit resumes said forward control after an elapse of a predetermined stand-by period subsequent to execution of said reverse control.

24. The power supply device according to claim 1, wherein at least each of said PWM signal generation circuit and said pulse width control unit comprises an ASIC.

25. The power supply device according to claim 1, wherein:
said target value used in said determination unit is set to have an allowable range between an upper limit value and a lower limit value; and
an impedance measurement unit that measures an impedance of said electric load and a second change unit that changes at least one of said upper limit value and said lower limit value based on said impedance are further provided.

26. The power supply device according to claim 25, wherein said second change unit changes at least one of said upper limit value and said lower limit value such that said allowable range is widened as said impedance becomes smaller under a constant current control.

27. The power supply device according to claim 1, wherein said pulse width control unit sets a pulse width of said PWM signal at a time such that a detection value of said detection unit is allowed to reach said target value based on a command for starting power supply, and maintain said pulse width until said detection value reaches said target value.

28. The power supply device according to claim 27, wherein when said detection value fails to reach said target value within a predetermined time, said pulse width control unit changes a pulse width of said PWM signal in a direction where said detection value is brought to be close to said target value, and maintains said pulse width until said detection value of said detection unit reaches said target value.

29. The power supply device according to claim 1, wherein:
said determination unit sets a temporary range that includes said target value between a temporary upper limit value and a temporary lower limit value; and
said pulse width control unit executes said reverse control when said detection value reaches said temporary range after execution of said forward control, and further executes said reverse control when said detection value reaches said target value under said forward control that has been resumed.

30. The power supply device according to claim 1, further comprising a control start unit that starts controlling said pulse width control unit when a detection value of said detection unit reaches a predetermined value.

31. The power supply device according to claim 1, further comprising a control start unit that starts controlling said pulse width control unit after an elapse of a predetermined time from an input of a command for starting power supply.

32. An image-forming apparatus comprising:
   a scanner portion that irradiates a laser beam to a photosensitive element to generate an electrostatic latent image;
   a development roller to which a development bias voltage is applied to allow a developer to be adhered to said photosensitive element so as to develop said electrostatic latent image;
   a transfer image carrier to which a transfer bias voltage is applied to transfer an image generated with said developer on said photosensitive element so as to be carried;
   a fixation portion that transfers a developer image of said transfer image carrier on a medium so as to be fixed; and
   a power supply device that generates said development bias voltage and said transfer bias voltage, wherein said power supply device is provided with
   a PWM signal generation circuit that generates a PWM signal,
   a control power supply circuit that supplies power in accordance with said PWM signal to an electric load,
   a detection unit that detects one of a supply voltage value and a supply current value of power supplied to said electric load,
   a determination unit that determines a deviation of a detection value detected by said detection unit from a target value, and
   a pulse width control unit capable of executing a forward control to change a pulse width of said PWM signal in a direction where said detection value is brought to be close to said target value, and a reverse control to change said pulse width of said PWM signal in a direction opposite to that of said forward control, in which said pulse width control unit executes said forward control when said determination unit determines that said deviation exists, and then executes said reverse control when said determination unit makes at least one of determinations that said deviation does not exist, and a magnitude relationship between said detected value and said target value is inverted.

* * * * *